United States Patent [19]
Inoguchi et al.

[11] Patent Number: 5,945,965
[45] Date of Patent: *Aug. 31, 1999

[54] STEREOSCOPIC IMAGE DISPLAY METHOD

[75] Inventors: Kazutaka Inoguchi, Kawasaki; Hiroaki Hoshi, Yokohama; Naosato Taniguchi, Urawa; Toshiyuki Sudo; Hideki Morishima, both of Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/671,169

[22] Filed: Jun. 26, 1996

[30] Foreign Application Priority Data

Jun. 29, 1995 [JP] Japan .................................... 7-188670
Apr. 12, 1996 [JP] Japan .................................... 8-115718

[51] Int. Cl.$^6$ .................................................. H04N 13/04
[52] U.S. Cl. .................................... 345/6; 345/9; 348/51; 349/15; 359/458; 359/462
[58] Field of Search ............................ 345/6, 9; 348/42, 348/51, 54; 349/15; 359/458, 462, 466, 630

[56] References Cited

U.S. PATENT DOCUMENTS

| | | | |
|---|---|---|---|
| 4,853,769 | 8/1989 | Kollin | 358/88 |
| 5,315,377 | 5/1994 | Isono et al. | 348/51 |
| 5,430,474 | 7/1995 | Hines . | |
| 5,600,388 | 2/1997 | Anderson | 396/324 |
| 5,640,273 | 6/1997 | Hamagishi et al. | 359/462 |
| 5,663,831 | 9/1997 | Mashitani et al. | 359/463 |

FOREIGN PATENT DOCUMENTS

| | | |
|---|---|---|
| 0328357A2 | 8/1989 | European Pat. Off. . |
| 0540137A1 | 5/1993 | European Pat. Off. . |

OTHER PUBLICATIONS

H. Isono, M. Yasuda, and H. Sasazawa, "Autostereoscopic 3–D Display Using LCD–Generated Parallax Barrier", Electronics and Communications in Japan, Part 2, vol. 76, No. 7, Jul. 1993.

European Patent Office Communication, Application No. 96304744.4, Date Jun. 13, 1997, p. 1.

European Search Report, Application No. EP 96 30 4744, Date of completion of the search Jun. 4, 1997, pp. 1 and 2.

Annex to the European Search Report on European Patent Application No. EP 96 30 4744, p. 1.

Primary Examiner—Mark R. Powell
Assistant Examiner—Vincent E. Kovalick
Attorney, Agent, or Firm—Morgan & Finnegan, L.L.P.

[57] ABSTRACT

This invention relates to an image display method, which includes the steps mainly characterized by allowing the observer to stereoscopically view the three-dimensional partial image by guiding a light beam coming from the three-dimensional partial image to a predetermined position via a partial parallax barrier, which is formed by light directivity controlling means, arranged to oppose the image displaying means, by alternately arranging stripe-shaped light-transmitting portions and light-shielding portions on an area corresponding to the three-dimensional partial image; and controlling, using light amount adjusting means, the brightness levels of the partial images to be observed by the observer in correspondence with the view point numbers of the partial images.

38 Claims, 15 Drawing Sheets

FIG. 2
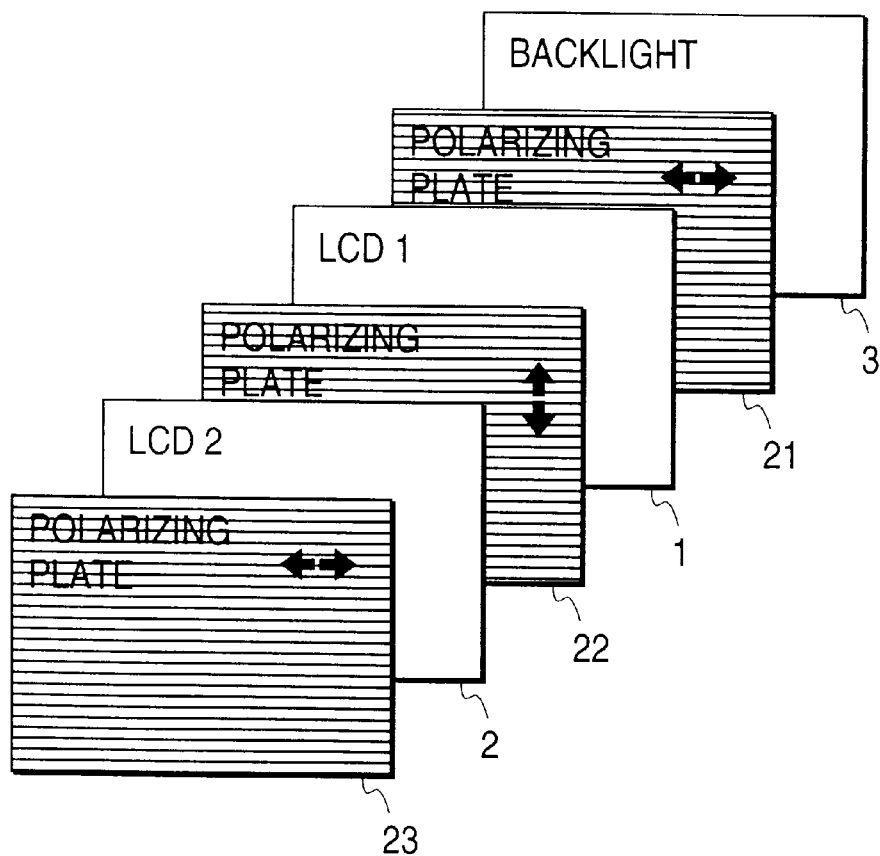

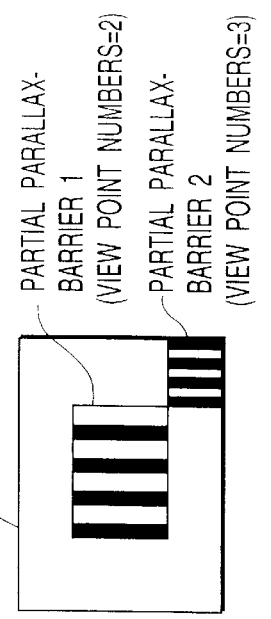
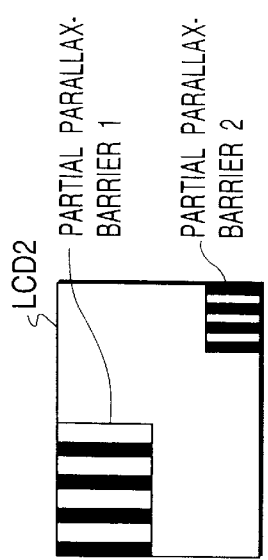
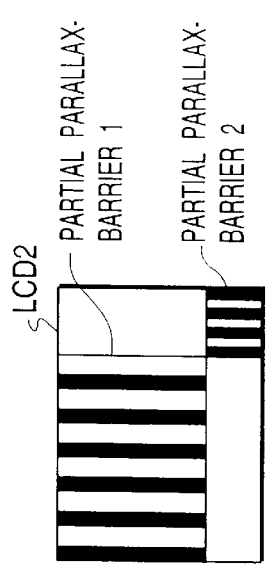
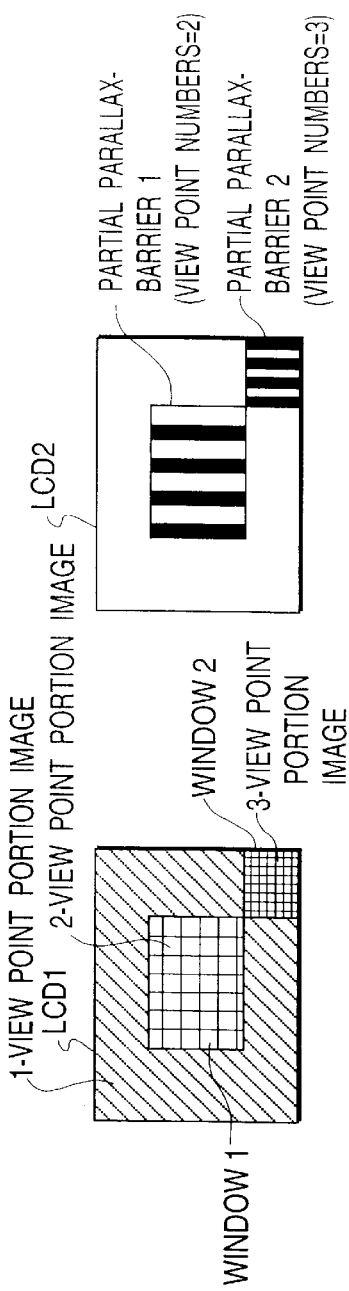
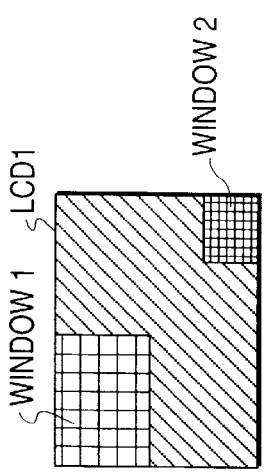
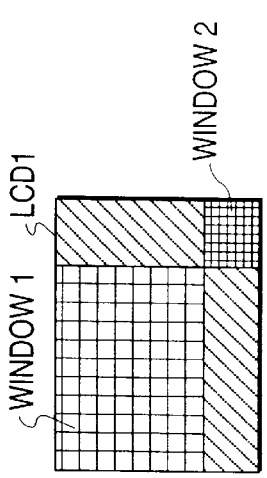
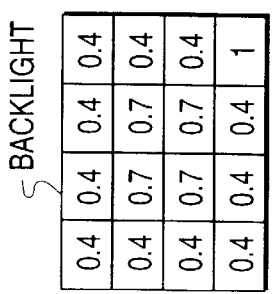
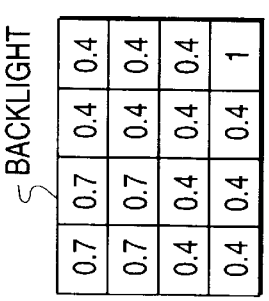
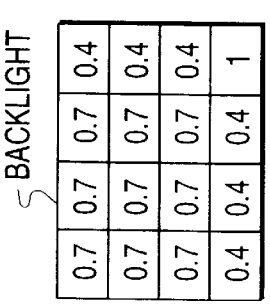

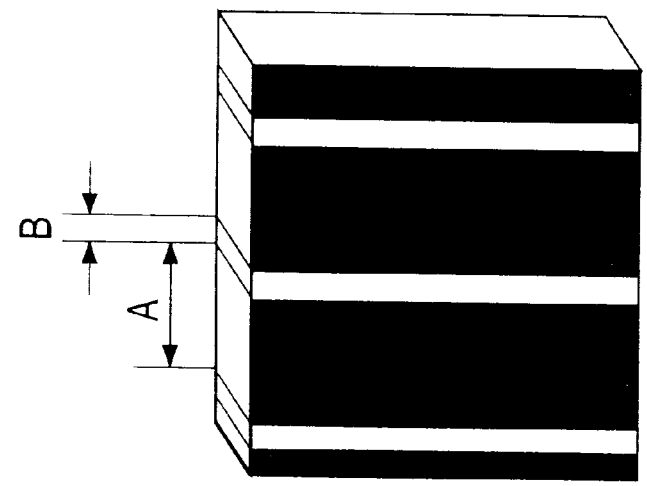
FIG. 16C (FOR SIX VIEW POINTS)
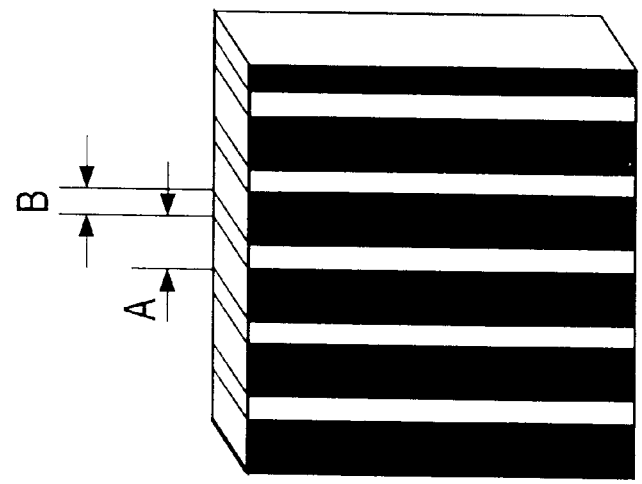
FIG. 16B (FOR THREE VIEW POINTS)
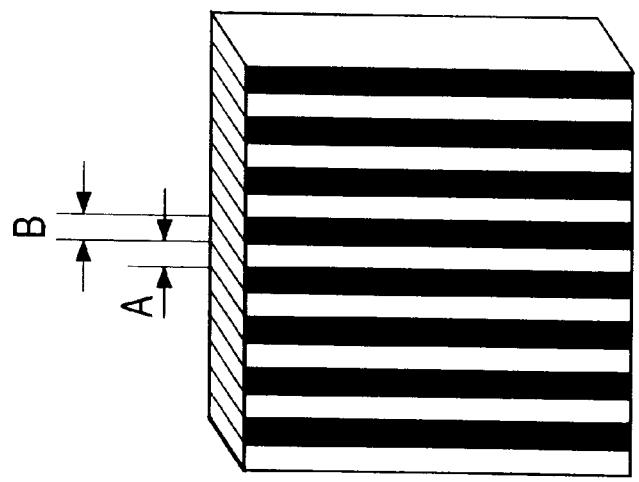
FIG. 16A (FOR TWO VIEW POINTS [PARALLAX · STEREOGRAM])

STEREOSCOPIC IMAGE DISPLAY METHOD

BACKGROUND OF THE INVENTION

1. Field of the Invention

The present invention relates to an image display method and an image display apparatus using the method and, more particularly, to an image display method and an image display apparatus using the method, which are suitably used for displaying a two-dimensional partial image (non-stereoscopic image) and a three-dimensional partial image together (mixed display) or selectively displaying a two-dimensional image and a three-dimensional image using a parallax barrier method.

2. Related Background Art

As a conventional stereoscopic image display method, a stereoscopic image display method using a parallax barrier system (to be referred to as a parallax barrier method hereinafter) or the like is widely known.

The parallax barrier method is disclosed in S. H. Kaplan, "Theory of Parallax Barriers", *J. SMPTE*, Vol. 59, No. 7, pp. 11–21 (1952). With this method, a stripe image formed by at least alternately arranging right and left image portions obtained from a plurality of parallax images picked up at a plurality of view points is observed via a slit (called a parallax barrier) having predetermined aperture portions as parallax images corresponding to the two eyes of an observer, thus attaining stereoscopic viewing.

Furthermore, Japanese Laid-Open Patent Application Nos. 3-119889 and 5-122733 disclose a stereoscopic image display apparatus which electronically generates a parallax barrier using, e.g., a transmission type liquid crystal element and electronically controls to vary the shape and position of the parallax barrier so as to improve compatibility with a two-dimensional image (1-view point image) display apparatus.

FIG. 14 is a diagram showing the basic arrangement of a stereoscopic image display apparatus disclosed in Japanese Laid-Open Patent Application No. 3-119889. In this apparatus, an electronic parallax barrier 103 is arranged on a transmission type liquid crystal display element 101 for displaying an image via a spacer (transparent glass) 102 having a thickness d. On the transmission type liquid crystal display element 101, parallax images picked up from two or more directions are displayed as a vertical stripe image. On the electronic parallax barrier 103, a parallax barrier is formed at an arbitrary position on the barrier surface by designating X and Y addresses using a control means such as a microcomputer 104, thus allowing stereoscopic viewing according to the principle of the parallax barrier method.

FIG. 15 shows the arrangement of a display portion of a stereoscopic image display apparatus, which is disclosed in Japanese Laid-Open Patent Application No. 3-119889 and is constituted by a liquid crystal panel display and an electronic parallax barrier. The display portion comprises a glass (spacer) portion 102, polarizing plates 111, 118, 121, and 128, upper glass substrates 112 and 122, lower glass substrates 117 and 227, liquid crystal layers (TN) 115 and 125, common electrodes 113 and 123, pixel electrodes 116 and 126, and spacers 114 and 124, which constitute an electronic parallax barrier 103 and a liquid crystal panel display 110. That is, the two liquid crystal layers 115 and 125 are respectively sandwiched between the two polarizing plates 111 and 118 and the two polarizing plates 121 and 128. When a two-dimensional image is to be displayed by this apparatus, the display operation of the parallax barrier on the electronic parallax barrier 103 is stopped, so that the entire image display area is set in the transparent state, thereby realizing compatibility with a two-dimensional image display apparatus unlike in a conventional stereoscopic image display apparatus using the parallax barrier method.

FIGS. 16A, 16B, and 16C respectively show different parallax barrier patterns to be formed on the electronic parallax barrier in correspondence with different numbers of view points. As shown in FIGS. 16A to 16C, upon observation of a stripe image constituted by parallax images obtained from two view points, the width, A, of each light-shielding portion can be set to be equal to the width, B, of each light-transmitting portion. However, as the number of view points increases, the width of each light-transmitting portion decreases with respect to that of each light-shielding portion. That is, as the number of view points increases, the aperture ratio of the electronic parallax barrier decreases.

On the other hand, Japanese Laid-Open Patent Application No. 5-122733 discloses an arrangement which can display a parallax barrier pattern on only a partial area of an electronic parallax barrier 103 comprising a transmission type liquid crystal display element, and can display a three-dimensional image and a two-dimensional image together on a single screen, as shown in FIGS. 17A and 17B.

However, as disclosed in Haruo Isono, Minoru Yasuda, and Hideaki Sasazawa, "Liquid Crystal Parallax Barrier Type Three-dimensional Image Display", *Journal of The Institute of Electronics, Information and Communication Engineers*, C-II, Vol. J76-C-II, No. 1, pp. 24–30 (1993), in a three-dimensional image display apparatus using the parallax barrier method, the luminance of the screen lowers as the number of view points increases. FIG. 18 is a graph showing the relationship between the number of view points and the luminance/resolution in the stereoscopic image display apparatus using the parallax barrier method. Taking the luminance in the case of one view point, i.e., upon displaying a two-dimensional image as "1", the screen luminance upon displaying a three-dimensional image lowers as the number of view points increases, as shown in FIG. 18. More specifically, when the three-dimensional image is a stripe image obtained by synthesizing parallax images obtained from two view points, the screen luminance becomes 0.6; when the three-dimensional image is a stripe image obtained by synthesizing parallax images obtained from three view points, the screen luminance becomes as dark as about 0.4.

Therefore, in the three-dimensional image display apparatus disclosed in Japanese Laid-Open Patent Application No. 3-119889, the screen luminance drastically changes upon switching between three- and two-dimensional images.

Similarly, in the mixed display method of three- and two-dimensional partial images disclosed in Japanese Laid-Open Patent Application No. 5-122733, three- and two-dimensional image display areas have different image brightness levels, and images displayed on these areas are not easy to see.

SUMMARY OF THE INVENTION

It is an object of the present invention to provide an image display method and an image display apparatus using the same, which can display three- and two-dimensional partial images together using a parallax barrier method so that the partial images have substantially constant brightness levels, or can switch an image display mode between the three- and two-dimensional image display modes without changing the brightness range of the screen.

In order to achieve the above object, according to one aspect of the present invention, there is provided an image display method comprising the steps of:

defining an image obtained from one view point as a two-dimensional image;

defining, as a three-dimensional image, a stripe image formed by dividing each of a plurality of parallax images from a plurality of view points into a plurality of stripe pixels and arranging the plurality of stripe pixels in a predetermined order;

displaying, on image displaying means, the two-dimensional image and the three-dimensional image together as a two-dimensional partial image and a three-dimensional partial image, or displaying a plurality of three-dimensional images with different view point numbers together as three-dimensional partial images;

allowing an observer to stereoscopically view the three-dimensional partial image by guiding a light beam coming from the three-dimensional partial image to a predetermined position via a partial parallax barrier, which is formed by light directivity controlling means, arranged to oppose the image displaying means, by alternately arranging stripe-shaped light-transmitting portions and light-shielding portions on an area corresponding to the three-dimensional partial image; and controlling, using light amount adjusting means, brightness levels of the partial images to be observed by the observer in correspondence with view point numbers of the partial images.

According to a preferred aspect, the controlling step includes the step of setting the brightness levels of the partial images to be substantially equal to each other.

According to a preferred aspect, the method further comprises the step of changing a pattern of the partial parallax barrier in correspondence with the view point number of the three-dimensional partial image.

According to a preferred aspect, illuminating means for illuminating the image displaying means illuminates by dividing an illumination surface thereof into a plurality of divided areas, and the method further comprises the step of adjusting, using the light amount adjusting means, light emission amounts of the illuminating means in units of divided areas.

According to a preferred aspect, the method further comprises the step of substantially superposing boundary lines of the partial images and boundary lines of the parallax barrier on dividing lines of the divided areas.

According to a preferred aspect, the image displaying means comprises a first light modulation panel, which is illuminated by illuminating means, and the method further comprises the steps of controlling, using the light amount adjusting means, a luminance value of the first light modulation panel in correspondence with the view point number of the partial image.

According to a preferred aspect, the image displaying means comprises a self-emitting type display element, and the method further comprises the step of controlling, using the light amount adjusting means, a luminance value of the self-emitting type display element in correspondence with the view point number of the partial image.

According to a preferred aspect, the light directivity controlling means comprises a second light modulation panel, and the method further comprises the step of controlling, using the light amount adjusting means, a transmittance of the light-transmitting portions of the partial parallax barrier in correspondence with the view point number of the corresponding partial image.

According to a preferred aspect, the image displaying means comprises a first light modulation panel, which is illuminated by illuminating means, the light directivity controlling means comprises a second light modulation panel, and the method further comprises the step of controlling, using the light amount adjusting means, a transmittance of the light-transmitting portions of the partial parallax barrier in correspondence with the view point number of the corresponding partial image.

According to a preferred aspect, the method further comprises the step of maintaining, using the light amount adjusting means, the brightness levels of the partial images to be substantially constant when an image displayed on the image displaying means is switched to another image.

According to a preferred aspect, the method further comprises the step of performing light amount adjustment after an image displayed on the image displaying means is switched to another image so as to maximize the brightness level, after the switching operation, to be visually recognized by the observer in the image displayed on the image displaying means when a total number of partial images displayed after the switching operation is 1.

According to a preferred aspect, the method further comprises the step of performing light amount adjustment after an image displayed on the image displaying means is switched to another image so as to gradually maximize the brightness level, after the switching operation, to be visually recognized by the observer in the image displayed on the image displaying means a predetermined period of time after the switching operation of the image when the brightness level to be visually recognized by the observer before and after the switching operation changes.

According to another aspect of the present invention, there is provided an image display method comprising the steps of:

defining an image obtained from one view point as a two-dimensional image;

defining, as a three-dimensional image, a stripe image formed by dividing each of a plurality of parallax images from a plurality of view points into a plurality of stripe pixels and arranging the plurality of stripe pixels in a predetermined order;

displaying, on image displaying means, the two-dimensional image and the three-dimensional image together as a two-dimensional partial image and a three-dimensional partial image, or displaying a plurality of three-dimensional images with different view point numbers together as three-dimensional partial images;

allowing an observer to stereoscopically view the three-dimensional partial image by guiding to a predetermined position, via the three-dimensional partial image, a light beam coming from a partial parallax barrier, which is formed by light directivity controlling means, arranged to oppose the image displaying means, by alternately arranging stripe-shaped light-transmitting portions and light-shielding portions on an area corresponding to the three-dimensional partial image; and controlling, using light amount adjusting means, brightness levels of the partial images to be observed by the observer in correspondence with view point numbers of the partial images.

According to a preferred aspect, the controlling step includes the step of setting the brightness levels of the partial images to be substantially equal to each other.

According to a preferred aspect, the method further comprises the step of changing a pattern of the partial parallax barrier in correspondence with the view point number of the three-dimensional partial image.

According to a preferred aspect, illuminating means for illuminating the image displaying means illuminates by dividing an illumination surface thereof into a plurality of divided areas, and the method further comprises the step of adjusting, using the light amount adjusting means, light emission amounts of the illuminating means in units of divided areas.

According to a preferred aspect, the method further comprises the step of substantially superposing boundary lines of the partial images and boundary lines of the parallax barrier on dividing lines of the divided areas.

According to a preferred aspect, the image displaying means comprises a first light modulation panel, and the method further comprises the steps of controlling, using the light amount adjusting means, a luminance value of the first light modulation panel in correspondence with the view point number of the partial image.

According to a preferred aspect, the light directivity controlling means comprises a second light modulation panel, and the method further comprises the step of controlling, using the light amount adjusting means, a transmittance of the light-transmitting portions of the partial parallax barrier in correspondence with the view point number of the corresponding partial image.

According to a preferred aspect, the method further comprises the step of maintaining, using the light amount adjusting means, the brightness levels of the partial images to be substantially constant when an image displayed on the image displaying means is switched to another image.

According to a preferred aspect, the method further comprises the step of performing light amount adjustment after an image displayed on the image displaying means is switched to another image so as to maximize the brightness level, after the switching operation, to be visually recognized by the observer in the image displayed on the image displaying means when a total number of partial images displayed after the switching operation is 1.

According to a preferred aspect, the method further comprises the step of performing light amount adjustment after an image displayed on the image displaying means is switched to another image so as to gradually maximize the brightness level, after the switching operation, to be visually recognized by the observer in the image displayed on the image displaying means a predetermined period of time after the switching operation of the image when the brightness level to be visually recognized by the observer before and after the switching operation changes.

According to still another aspect of the present invention, there is provided an image display method comprising the steps of:

defining an image obtained from one view point as a two-dimensional image;

defining, as a three-dimensional image, a stripe image formed by dividing each of a plurality of parallax images from a plurality of view points into a plurality of stripe pixels and arranging the plurality of stripe pixels in a predetermined order;

displaying, on image displaying means, the two-dimensional image and the three-dimensional image together as a two-dimensional partial image and a three-dimensional partial image, or displaying a plurality of three-dimensional images with different view point numbers together as three-dimensional partial images;

allowing an observer to stereoscopically view the three-dimensional partial image by guiding to a predetermined position, via the three-dimensional partial image, a light beam coming from a partial parallax barrier, which is formed by light directivity controlling means, arranged to oppose the image displaying means and constituted by a plurality of self-emitting type elements, by alternately arranging stripe-shaped light-emitting portions and non-light-emitting portions on an area corresponding to the three-dimensional partial image; and controlling, using light amount adjusting means, brightness levels of the partial images to be observed by the observer in correspondence with view point numbers of the partial images.

According to a preferred aspect, the controlling step includes the step of setting the brightness levels of the partial images to be substantially equal to each other.

According to a preferred aspect, the method further comprises the step of changing a pattern of the partial parallax barrier in correspondence with the view point number of the three-dimensional partial image.

According to a preferred aspect, the method further comprises the step of controlling, using the light amount adjusting means, a luminance value of the light-emitting portions of the parallax barrier in correspondence with the view point number of the partial image.

According to a preferred aspect, the method further comprises the step of maintaining, using the light amount adjusting means, the brightness levels of the partial images to be substantially constant when an image displayed on the image displaying means is switched to another image.

According to a preferred aspect, the method further comprises the step of performing light amount adjustment after an image displayed on the image displaying means is switched to another image so as to maximize the brightness level, after the switching operation, to be visually recognized by the observer in the image displayed on the image displaying means when a total number of partial images displayed after the switching operation is 1.

According to a preferred aspect, the method further comprises the step of performing light amount adjustment after an image displayed on the image displaying means is switched to another image so as to gradually maximize the brightness level, after the switching operation, to be visually recognized by the observer in the image displayed on the image displaying means a predetermined period of time after the switching operation of the image when the brightness level to be visually recognized by the observer before and after the switching operation changes.

The detailed embodiments of the present invention will become apparent from some embodiments to be described below.

BRIEF DESCRIPTION OF THE DRAWINGS

FIG. 2 is an explanatory view of the arrangement of a display portion of the first embodiment;

FIGS. 6A to 6C, 6D to 6F, and 6G to 6I are explanatory views of the relationship among the light emission amounts of the respective divided areas of the backlight, partial images on an LCD 1, and a partial parallax barrier on an LCD 2 in the first embodiment;

FIGS. 16A, 16B, and 16C are explanatory views of the relationship between parallax barrier patterns and the numbers of view points;

DETAILED DESCRIPTION OF THE PREFERRED EMBODIMENTS

Figure 1:
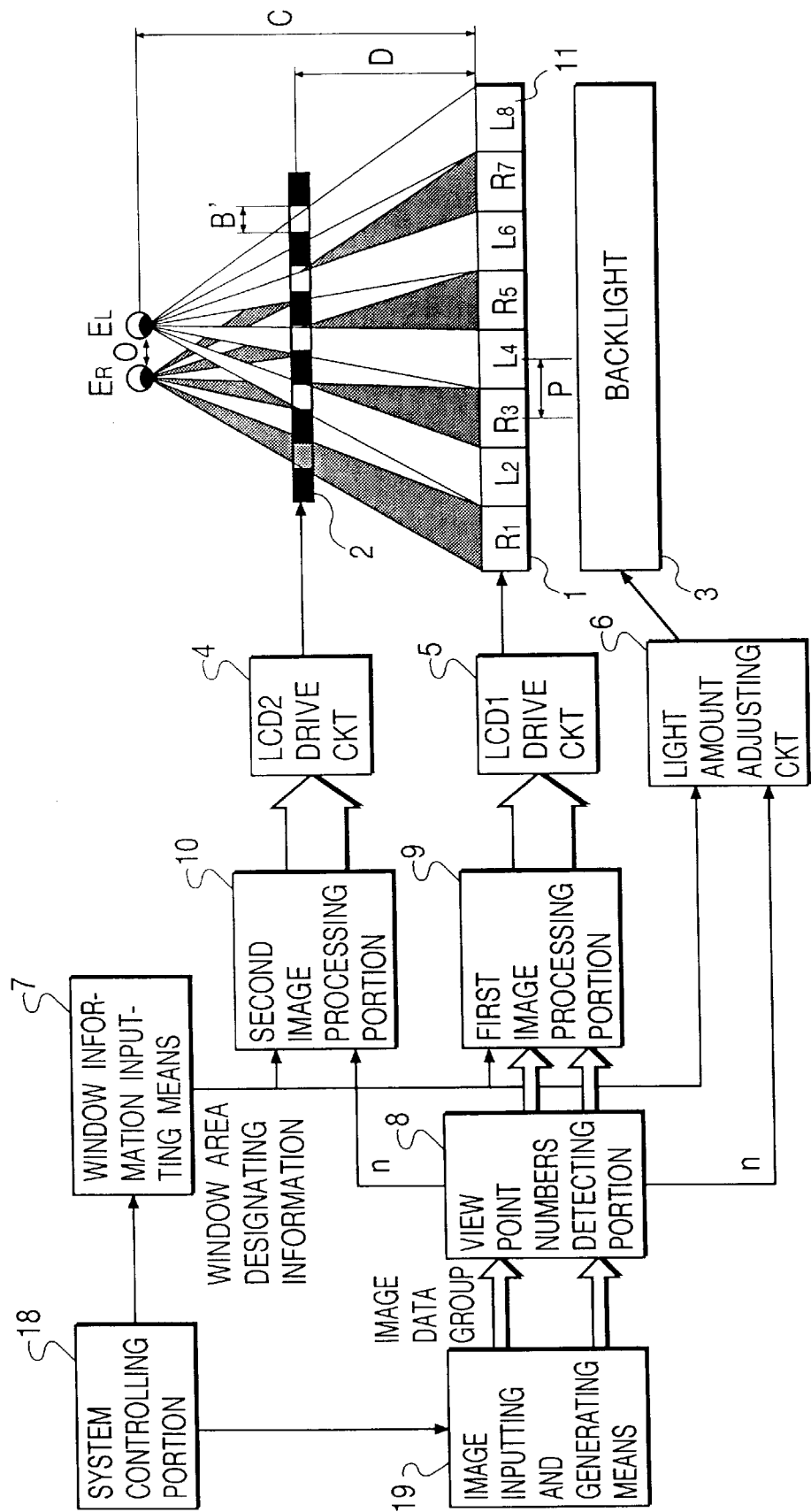
FIG. 1 is a schematic diagram showing the arrangement of an image display apparatus according to the first embodiment of the present invention.

An image display apparatus of the present invention selectively displays a two-dimensional image (non-stereoscopic image) obtained from one view point, and a three-dimensional image (stereoscopic image) obtained from a plurality of view points, or displays some windows on the display surface, as indicated by an LCD 1 in FIG. 6B, and displays two- and three-dimensional partial images together in units of areas limited by these windows. In this specification, the image to be displayed on a window will be referred to as a partial image hereinafter, and the background image will also be referred to as a partial image.

A three-dimensional image to be displayed on the display screen of the image display apparatus of the present invention will be explained below. A three-dimensional image is synthesized based on a plurality of images with the parallax (i.e., parallax images) obtained from a plurality of view points. In order to synthesize a three-dimensional image, at least two parallax images are required. Let $R_s$ be the parallax image corresponding to the right eye, and $L_s$ be the parallax image corresponding to the left eye. These parallax images are divided into vertically elongated stripe pixels Ri and Li (i=1, 2, 3, . . . ) having the same width. One image constituted by arranging these stripe pixels in the order of R1, L2, R3, L4, . . . (or L1, R2, L3, R4, . . . ) is a three-dimensional image, which is also called a stripe image. If there are three parallax images A, B, and C, a stripe image is obtained by arranging stripe pixels in the order of A1, B2, C3, A4, B5, C6, . . . , or B1, C2, A3, B4, C5, A6, . . . , or C1, A2, B3, C4, A5, B6, . . . When a three-dimensional image constituted by stripe pixels is observed via a parallax barrier, it can be recognized as a stereoscopic image. In the case of the present invention, since partial images having different numbers of view points are displayed together, parallax barriers are formed in units of areas corresponding to three-dimensional partial images on an element that forms a parallax barrier (for example, an LCD 2 (to be described later) in the first embodiment; or a CRT 25 (to be described later) in the fourth embodiment). In this specification, a parallax barrier formed in correspondence with a partial image will be referred to as a partial parallax barrier. The partial parallax barrier is a pattern defined by alternately arranging vertically elongated stripe-shaped light-transmitting portions and light-shielding portions (light-emitting portions and non-light-emitting portions in the fourth embodiment), as shown in FIGS. 16A, 16B, and 16C, and the widths of the light-transmitting portions and the light-shielding portions change in correspondence with the number of view points of a partial image. As shown in FIGS. 16A, 16B, and 16C, as the number of view points, the width of each light-transmitting portion relatively decreases. Since a 1-view point partial (portion) image is a non-stereoscopic image, the entire area corresponding to the 1-view point partial image on the element that forms the parallax barrier is defined by only light-transmitting portions (or only light-emitting portions). For the sake of simplicity, in this specification, the partial parallax barrier corresponding to the 1-view point partial image is defined by only light-transmitting portions. In the following description, a partial parallax barrier will be abbreviated as "partial PB".

FIG. 1 is a schematic diagram showing the arrangement of an image display apparatus according to the first embodiment of the present invention. A first light modulation panel 1 (image displaying means, LCD 1) comprises a transmission type liquid crystal display element (LCD). A backlight 3 (illuminating means) illuminates the first light modulation panel 1.

A second light modulation panel 2 (light directivity controlling means, LCD 2) comprises a transmission type liquid crystal display element (LCD). The LCD 2 displays a parallax barrier on an area corresponding to a stripe image 11 in correspondence with the stripe image 11 displayed on the LCD 1. The parallax barrier is a pattern defined by alternately arranging vertical stripe-shaped light-transmitting portions and light-shielding portions in the horizontal direction, and guides light beams from stripe pixels constituting the stripe image 11 to predetermined observation positions, thus allowing an observer to stereoscopically observe the stripe image 11.

The LCDs 1 and 2, the backlight 3, and the like correspond to constituting elements of a display portion. FIG. 1 shows the horizontal section of the display portion. The LCD 1 selectively displays a two- or three-dimensional image or displays them together as partial images on its display screen. FIG. 1 exemplifies a case wherein a three-dimensional partial image based on two view points is displayed, i.e., illustrates a stripe image 11 synthesized by arranging stripe pixels in the order of R1, L2, R3, L4, R5, L6, . . . from the left end of the screen. FIG. 2 is an explanatory view of the arrangement of the display portion of this embodiment. Referring to FIG. 2, the display portion also comprises polarizing plates 21, 22, and 23, which have directions of polarization indicated by arrows. The directions of polarization of adjacent polarizing plates are perpendicular to each other. The display portion of this embodiment is constituted by arranging the polarizing plate 21, the LCD 1, the polarizing plate 22, the LCD 2, and the polarizing plate 23 to overlap each other in turn from the backlight 3 toward the observer side. The arrangement of the display portion of this embodiment is a so-called front barrier system in which the light directivity controlling means is arranged on the observer side of the image displaying means.

The relationship between the two LCDs constituting the display portion of the apparatus of this embodiment will be described below with reference to FIG. 1. Let O be the interval (base length) between the two eyes of the observer, C be the observation distance of the LCD 1, D be the interval between the LCDs 1 and 2, B' be the width of each light-transmitting portion of a partial parallax barrier, and P be the pixel interval of stripe pixels displayed on the LCD 1. Then, to attain stereoscopic viewing, these parameters must satisfy the following relations:

$$D = P \cdot C/(O+P) \quad (1)$$

$$B' = P \cdot (C-D)/C \quad (2)$$

Note that the observation width has a finite divergence at the observation position in practice, and these quantities are set after they are slightly modified. These relationships have been described in detail in S. H. Kaplan, "Theory of Parallax Barriers", *J. SMPTE*, Vol. 59, No. 7, pp. 11–21 (1952).

By appropriately changing the above-mentioned parameters, a stereoscopic image based on three or more view points can be displayed, and a partial parallax barrier to be displayed on the LCD 2 can be formed to match the state of the image.

Referring to FIG. 1, an LCD 2 drive circuit 4 drives the LCD 2, and an LCD 1 drive circuit 5 drives the LCD 1. A light amount adjusting circuit (light amount adjusting means) 6 adjusts the light emission amount of the backlight 3. A window information inputting means 7 is connected to the light amount adjusting circuit 6. Note that the entire display screen is handled as one window. An image inputting and generating means 19 inputs or generates a background image (as one partial image) and a partial image to be displayed on each window. At this time, if the partial image is a two-dimensional partial image, the means 19 inputs or generates only one image. However, if the partial image is a three-dimensional partial image, the means 19 inputs or generates parallax images corresponding to a plurality of view points. A view point numbers detecting portion (view point numbers detecting means) 8 detects based on input or synthesized image data whether the partial image is a two-dimensional image (the view point number (the number of view points) n=1) or a three-dimensional image (the view point number n≧2), and detects the number n of view points if the partial image is a three-dimensional image. The view point number n will also be referred to as view point numbers information hereinafter. The view point numbers detecting portion 8 is connected to first and second image processing portions 9 and 10. Also, a system controlling portion 18 is connected to the window information inputting means 7 and the image inputting and generating means 19.

Figure 3A:
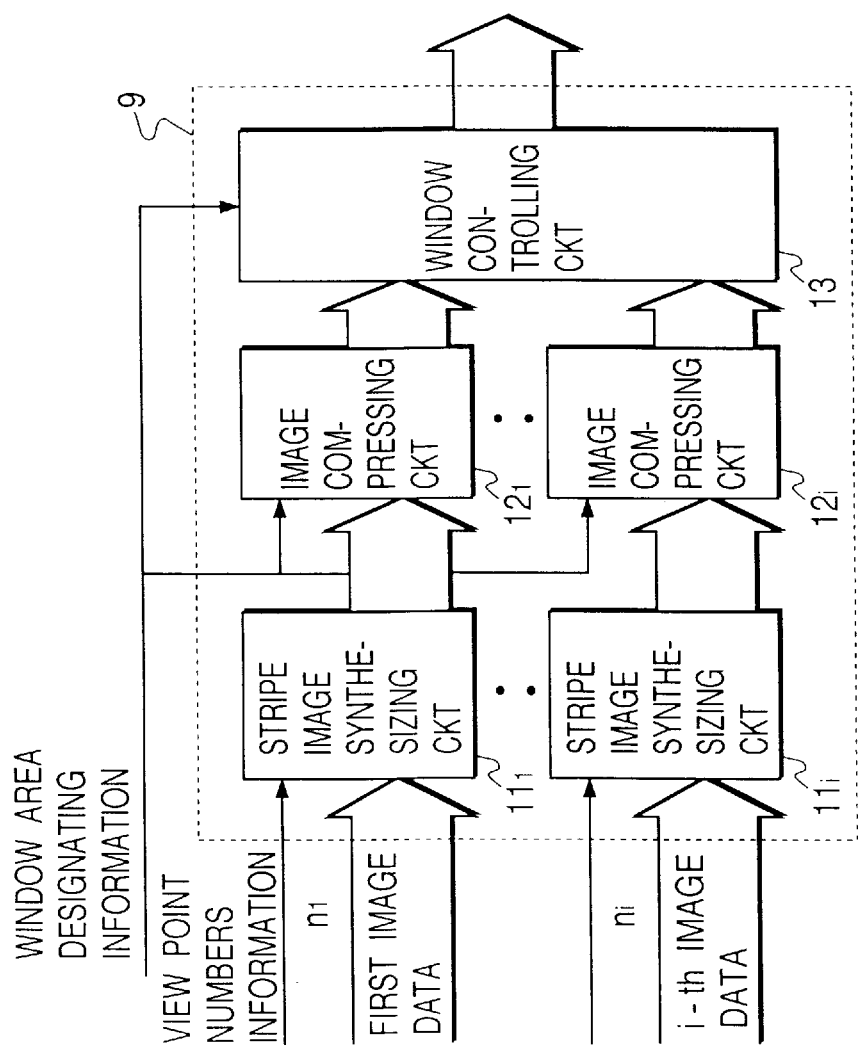
FIGS. 3A and 3B are schematic circuit diagrams showing the arrangement of an image processing portion of the first embodiment.

FIG. 3A is a circuit diagram showing the arrangement of the first image processing portion 9 of the first embodiment. Each of i-th stripe image synthesizing circuits $11_i$ receives i-th image data and view point numbers information ni of the image data, divides n parallax images into a plurality of vertically elongated stripe pixels, and synthesizes a single stripe image by arranging the stripe pixels in a predetermined order. When the input image data is a two-dimensional image, each of the circuits $11_i$ directly outputs the input data to the next stage.

Each of i-th image compressing circuits $12_i$ compresses stripe image data or two-dimensional image data output from the previous stage to a window size in accordance with window area designating information of a window for displaying the i-th image data.

Pairs of stripe image synthesizing circuits $11_i$ and image compressing circuits $12_i$ are arranged and formed in parallel with each other in correspondence with the number of windows to be displayed on the LCD+1 (corresponding to a background image). A window controlling circuit 13 sets a plurality of windows in a background image on the basis of image data from the image compressing circuits $12_i$ and the window area designating information, forms an image that displays the compressed stripe or two-dimensional images, and displays the formed image on the LCD 1 via the LCD 1 drive circuit 5.

Figure 3B:
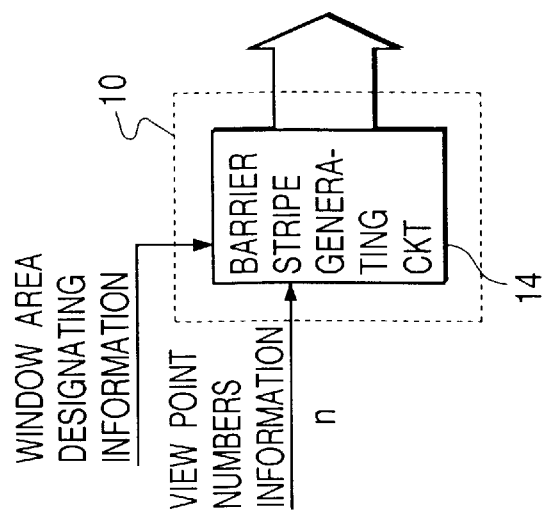

FIG. 3B is a circuit diagram showing the arrangement of the second image processing portion 10 of the first embodiment. As shown in FIG. 3B, the second image processing portion 10 has a barrier stripe generating circuit 14, which receives view point numbers information n from the view point numbers detecting portion 8 and window area designating information from the window information inputting means 7, generates, on the LCD 2, a partial parallax barrier (partial PB) corresponding to a three-dimensional partial image to be displayed on the LCD 1, and displays the partial PB on the LCD 2 via the LCD 2 drive circuit 4.

Figure 4:
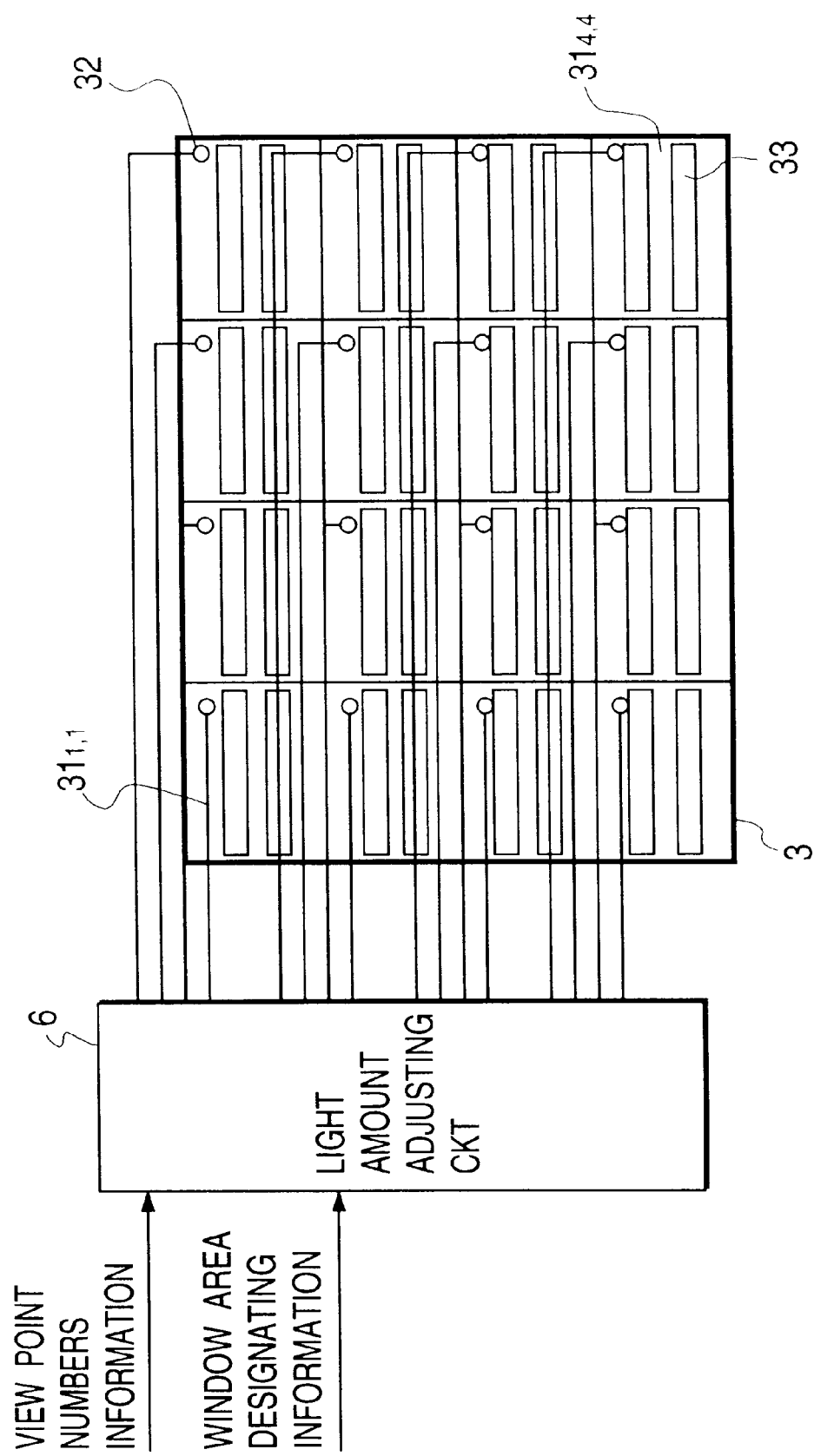
FIG. 4 is a schematic diagram showing the arrangement of a backlight of the first embodiment.
Figure 5A:
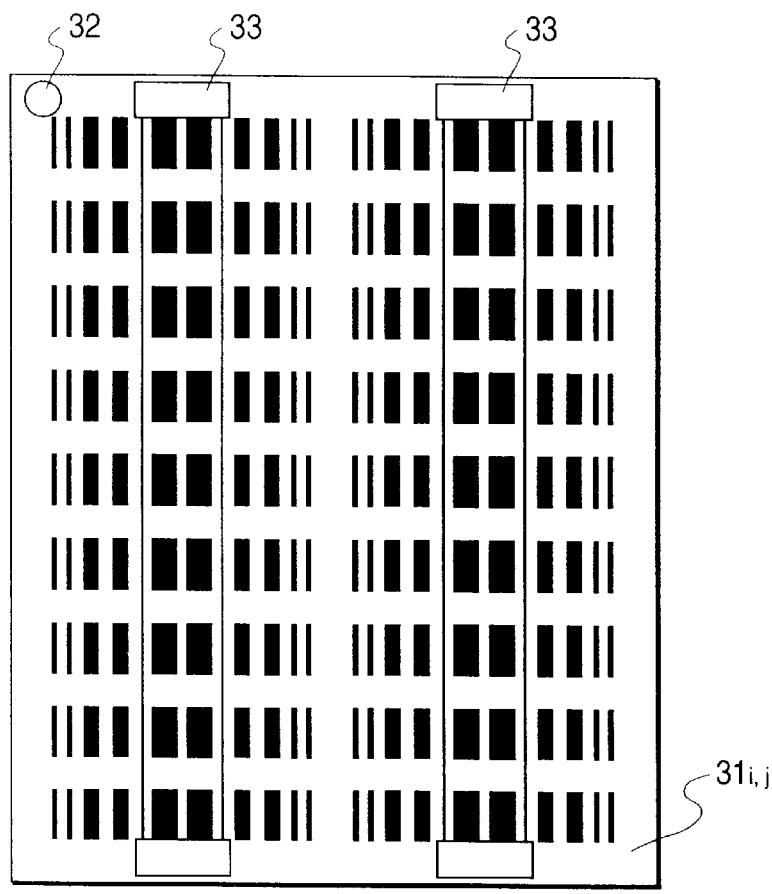
FIGS. 5A and 5B are respectively a front view and sectional view showing principal part of one divided area of the backlight of the first embodiment.
Figure 5B:
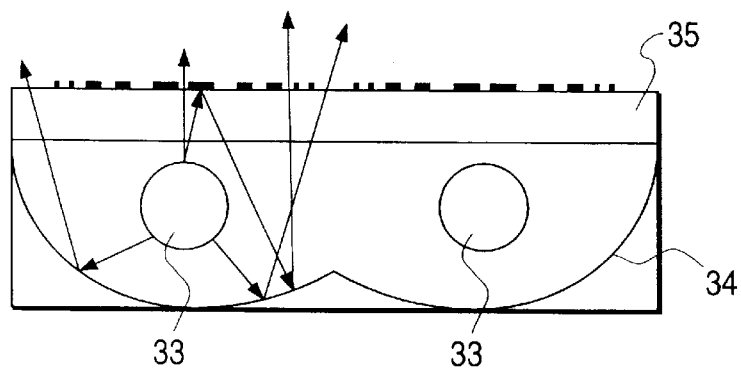

FIG. 4 is a schematic diagram showing the arrangement of the backlight of this embodiment. FIG. 4 illustrates the backlight 3 portion as a front view. FIGS. 5A and 5B are respectively a front view and a sectional view of one divided area of the backlight. The illumination surface of the backlight 3 is equally divided into four areas in the vertical direction and is also equally divided into four areas in the horizontal direction, i.e., is divided into a total of 16 areas $31_{i,j}$. Each divided area $31_{i,j}$ has an inputting portion, and the light amount adjusting circuit 6 controls the light emission amount of each divided area $31_{i,j}$ by inputting a pulse signal via an inputting portion 32. Each divided area $31_{i,j}$ has fluorescent lamps 33, a reflection plate 34, and a scattering plate 35.

As described above, the backlight 3 of this embodiment is divided into the plurality of areas $31_{i,j}$ (i=1 to 4, j=1 to 4), and has the fluorescent lamps 33, the inputting portion 32, and a circuit (not shown) for turning on the fluorescent lamps in each divided area. Based on the window area designating information and the view point numbers information input to the light amount adjusting circuit 6, the frequency of a pulse signal input to the fluorescent lamp lighting circuit of each divided area $31_{i,j}$ is changed to control the light emission amount of the fluorescent lamps.

The reflection plate 34 is arranged on the rear surface of each divided area $31_{i,j}$ to improve illumination efficiency, and the scattering plate 35 is arranged on the front surface so as to illuminate the corresponding illumination portion of the LCD with uniform light.

Therefore, the backlight 3 constitutes a divisional illumination backlight, which can generate illumination light with a uniform luminance on the entire surface of each divided area, and can independently control the light emission amount of each divided area.

The flow of processing of this embodiment will be described below with reference to FIGS. 3A and 3B, and FIG. 4. The system controlling portion 18 inputs information associated with the number, sizes, positions, and the like of windows, i.e., window area designating information by controlling the window information inputting means 7. This information is output to the first and second image processing portions 9 and 10, and the light amount adjusting circuit 6.

The system controlling portion 18 controls the image inputting and generating means 19 to generate or input a background image and partial images to be displayed on the windows. At this time, if the partial image is a two-dimensional image, the means 19 generates or inputs one image data; if the partial image is a three-dimensional image, the means 19 generates or inputs parallax images corresponding to the view point number n. The input image has data indicating its view point number and a window to be displayed. An image data group including a plurality of such image data is parallelly input to the view point numbers detecting portion 8.

The view point numbers detecting portion 8 detects view point numbers ni in units of image data, and parallelly outputs the detected view point numbers information ni to the first image processing portion 9 together with the image data. Also, the view point numbers detecting portion 8 outputs the detected view point numbers information ni to the second image processing portion 10 and the light amount adjusting circuit 6.

The operation in the first image processing portion 9 will be explained below. If each of the stripe image synthesizing circuits $11_i$ determines based on the image data and the view point numbers information ni of the image data that the input image data is a three-dimensional image (the view point number n≧2), the circuit $11_i$ divides ni parallax image data into a plurality of stripe pixels, forms a single stripe image by alternately arranging the stripe pixels in a predetermined order, and outputs the stripe image to the next stage. If the input image data is a two-dimensional image data (the view point number n=1), the circuit $11_i$ directly outputs the image data to the next stage. Each of the image compressing circuits $12_i$ compresses the image data output from the previous stage to the corresponding window size on the basis of the window area designating information, and outputs the compressed image data to the window controlling circuit 13.

The window controlling circuit 13 receives the image data compressed to the corresponding window sizes from the respective image compressing circuits $12_i$, forms image information for one screen by appropriately determining the layout of these image data on the basis of the window area designating information, and outputs the formed image information to the LCD 1 drive circuit 5. The LCD 1 drive circuit 5 drives the LCD 1 on the basis of the image information, and displays a synthesized image on the display screen of the LCD 1.

The second image processing portion 10 receives the view point numbers information and the window area designating information, generates image data of partial PBs corresponding to three-dimensional partial images to be displayed on the LCD 1, and outputs them to the LCD 2 drive circuit 4. The LCD 2 drive circuit 4 drives the LCD 2 on the basis of the input image data, and forms partial PBs on areas corresponding to the three-dimensional partial images on the display screen of the LCD 2. The light amount adjusting circuit 6 controls the light emission amounts of the respective divided areas of the backlight 3 on the basis of the window area designating information and the view point numbers information n.

FIGS. 6A to 6I are explanatory views showing the relationship among the light emission amounts of the respective divided areas of the backlight, partial images displayed on the LCD 1, and partial PBs displayed on the LCD 2. Numerals in the respective divided areas of the backlight represent the relative light amount ratios.

The luminance of each partial image and the movement and size change of a window will be explained below while taking as an example a case wherein a two-dimensional partial image (1-view point partial image) is displayed as a background image of the LCD 1, and window 1 that displays a 2-view point three-dimensional image and window 2 that displays a 3-view point three-dimensional image are simultaneously displayed thereon.

Figure 18:
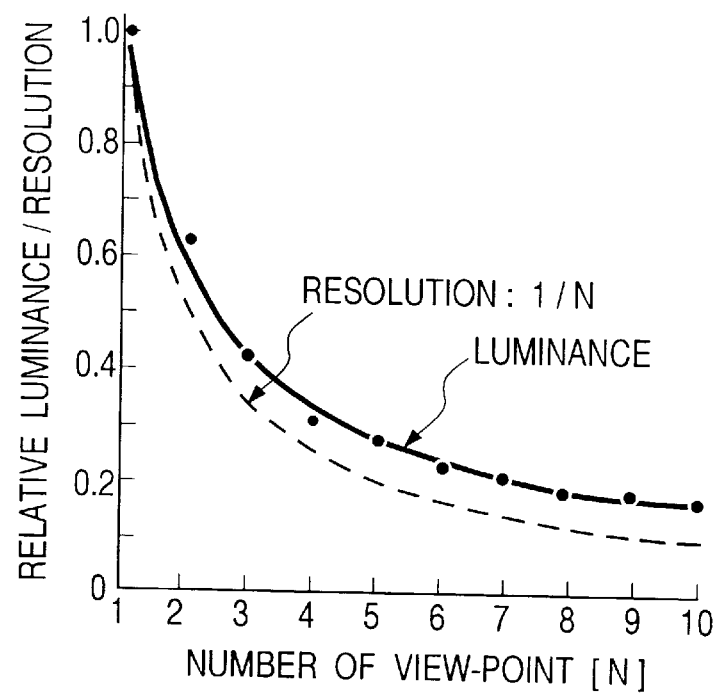
FIG. 18 is a graph showing the relationship between the number of view points and the luminance/resolution in the conventional stereoscopic image display apparatus.

In this embodiment, as shown in FIGS. 6A, 6D, and 6G, taking the brightness of the divided areas of the backlight, which illuminate a 3-view point partial image as "1", the brightness of the divided areas of the backlight, which illuminates a 2-view point partial image is 0.7, and the brightness of the divided areas of the backlight, which illuminate a 1-view point partial image is 0.4. Thus, the brightness assumes different values depending on the view point numbers. This is to correct relative darkness of an image since the aperture ratio of the parallax barrier pattern must be lowered as the view point number increases. Using the brightness of illumination of the backlight×the view point number and also using data shown in FIG. 18, a decrease in image luminance can be calculated as follows:

When n=1: 0.4×1=0.4

When n=2: 0.7×0.6=0.42

When n=3: 1×0.4=0.4

In this manner, the observer can recognize substantially the same brightness levels (luminance range) independently of the types of partial images.

As described above, the present invention is characterized in that the brightness levels of partial images to be observed by the observer are controlled by the light amount adjusting means in correspondence with the view point numbers, so as to set the partial images to have substantially equal brightness levels. Note that "to set the partial images to have substantially equal brightness levels" means that when an original image which exhibits the maximum luminance on the entire screen is converted into a partial image and the partial image is displayed, the brightness level of the darkest partial image to be observed by the observer is set to be 80% or higher that of the brightest partial image.

In this embodiment, as shown in FIGS. 6A, 6B, and 6C, the boundary lines of partial images 1 and 2 (windows 1 and 2) and partial PBs 1 and 2 to be formed on the LCDs 2 and 1 are superposed on the dividing lines of the divided areas of the backlight 3.

Upon movement of window 1 to a position shown in FIGS. 6D, 6E, and 6F using an inputting means such as a mouse, the threshold value of the moving amount of the mouse is determined in advance, and at the same time when the moving amount exceeds the threshold value, the window position is controlled to move in units of divided area sizes of the backlight.

Upon changing the size of window 1, as shown in FIGS. 6G, 6H, and 6I, the threshold value of the moving amount of the mouse is similarly determined in advance, and at the same time when the moving amount exceeds the threshold value, the size of the window is controlled to change in units of divided area sizes of the backlight.

As described above, since the boundary lines of the partial images (windows) are always controlled to overlap the dividing lines of the areas of the backlight, when both three- and two-dimensional partial images are displayed on the screen, the brightness range (luminance range) of the entire screen can be maintained to be substantially constant.

More specifically, in this embodiment, the light amount adjusting means controls the light emission amounts of the divided areas of the illumination means on the basis of the view point number information of partial images to be displayed on the first light modulation panel, thereby adjusting the brightness levels of partial images to be observed by the observer to substantially constant levels.

In this embodiment, when an image with a small view point number is displayed on the LCD 1, the illumination light amount is lowered, thus attaining power savings.

In this embodiment, since the time required from the generating/inputting operations of images to their output operations is controlled so that the light emission of the backlight 3, the partial image display operation on the LCD 1, and the partial PB display operation on the LCD 2 are performed at the same time, a substantially constant luminance range of the respective images can be maintained even when three- and two-dimensional images are displayed together on the screen.

When the window is to be moved or the window size is to be changed, a two-dimensional image may be displayed at the window position of the LCD 1, the corresponding partial PB to be displayed on the LCD 2 may be constituted by only light-transmitting portions, and the backlight 3 may be controlled to have a light amount used upon displaying a two-dimensional image independently of the view point number of an image in the window. Upon completion of the moving or size changing operation of the window in units of sizes of the divided areas, a partial image and a partial PB with a brightness corresponding to the view point number may be displayed.

The backlight 3 of this embodiment may be constituted by, e.g., a two-dimensional array LED divided to have the same pixel size as that of the LCDs 1 and 2, and may be controlled, so as to attain smooth movement of the window and smooth change in window size.

In the present invention, when the display state is switched to the full-screen display state of a two- or three-dimensional image, a substantially constant luminance range of the entire screen can be maintained. For example, assume that a maximum 3-view point partial image is displayed on the image displaying means. At this time, in this embodiment, when 1- to 3-view point images are displayed at the same time, the brightness of each partial image to be observed by the observer is about 0.4 as the above-mentioned value. Thus, in the full-screen display state, a two- or three-dimensional image (both images are defined as partial images) is displayed on the entire screen to have a brightness of 0.4. When the brightness of an image is controlled in this manner, even when the display state is switched to the full-screen display state of a two- or three-dimensional image, a substantially constant luminance range of the entire screen can be maintained.

Also, in the present invention, only when the image to be displayed on the entire screen is switched to a two- or three-dimensional image, the light amount adjustment before and after the switching operation may be inhibited.

For example, if the maximum view point number of partial images in the mixed display state is 3, the brightness of each partial image is about 0.4 as the above-mentioned value. Upon switching from this state to the full-screen display state of a two-dimensional image, if the above-mentioned display method that can maintain a substantially constant luminance range of the entire screen is used, although an image can be displayed to have a brightness of 1 as the above-mentioned value with respect to the performance of the backlight, the image is displayed to have a brightness of about 0.4. Therefore, a dark image is displayed on the entire screen relative to the performance of the backlight. For this reason, the above-mentioned method is not suitable for a backlight with low performance.

Therefore, upon reception of information indicating that the number of windows including a background image is 1 from the window information inputting means 7, the light amount adjusting circuit 7 performs light amount adjustment after the switching operation so as to turn on the backlight to exhibit its maximum luminance. On the contrary, when the full-screen display state of a two- or three-dimensional image is switched to the mixed-display state, the above-mentioned light amount adjustment is performed in correspondence with the luminance of a partial image having the maximum view point number of those to be displayed together. In this manner, although the mixed-display state and the full-screen display state of a two- or three-dimensional image have a luminance difference, no luminance difference is generated in a single screen. Therefore, in the full-screen display mode of a partial image, an image can be displayed to have a maximum luminance.

In the above-mentioned method, when the luminance changes abruptly upon switching of the display state, the light amount adjustment may be performed so that the state having a brightness of 0.4 as the above-mentioned value may be gradually switched to the state having the maximum luminance (about 1 as the above-mentioned value) over a predetermined period of time.

Figure 7:
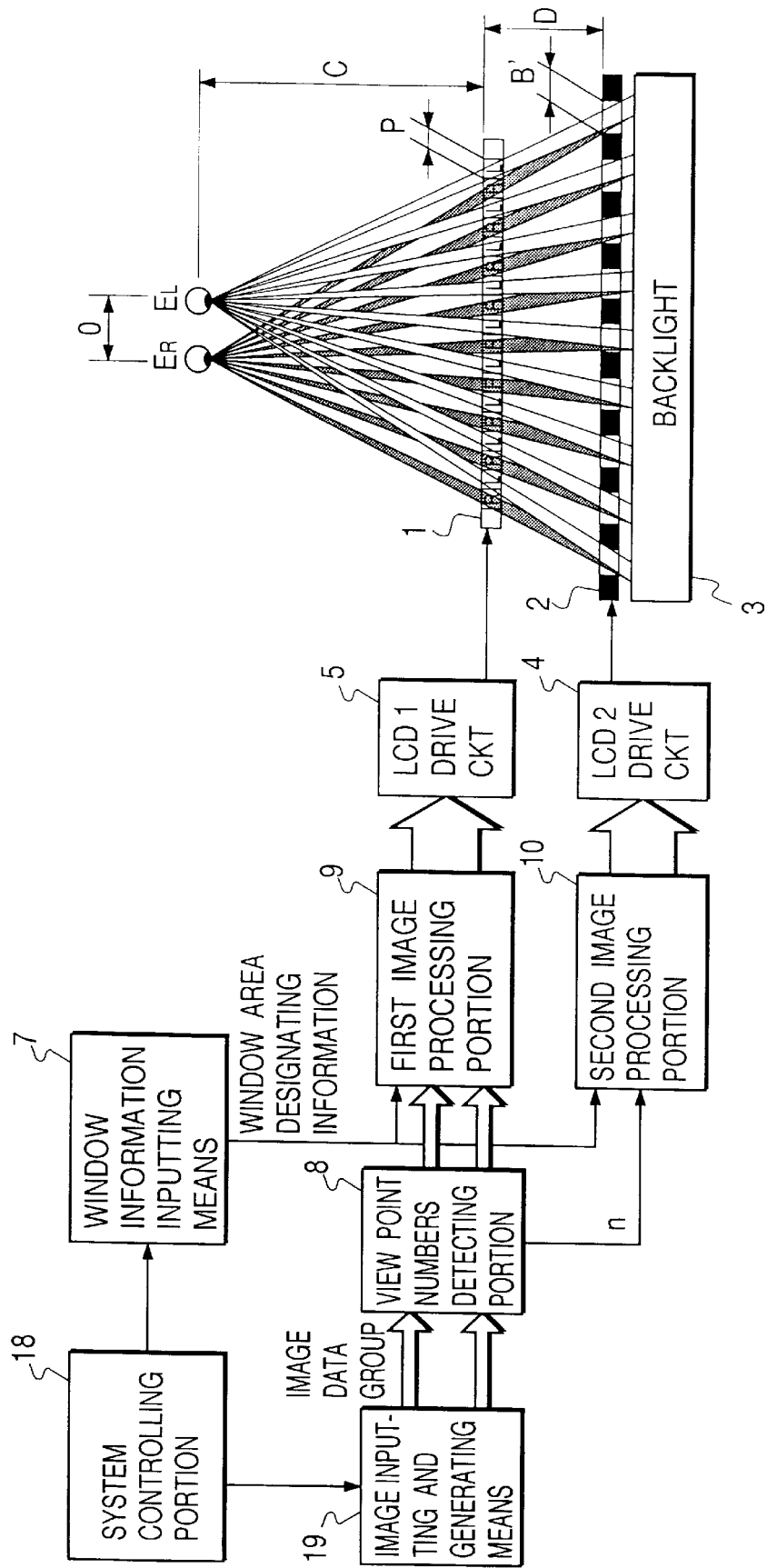
FIG. 7 is a schematic diagram showing the arrangement of an image display apparatus according to the second embodiment of the present invention.
Figure 8:
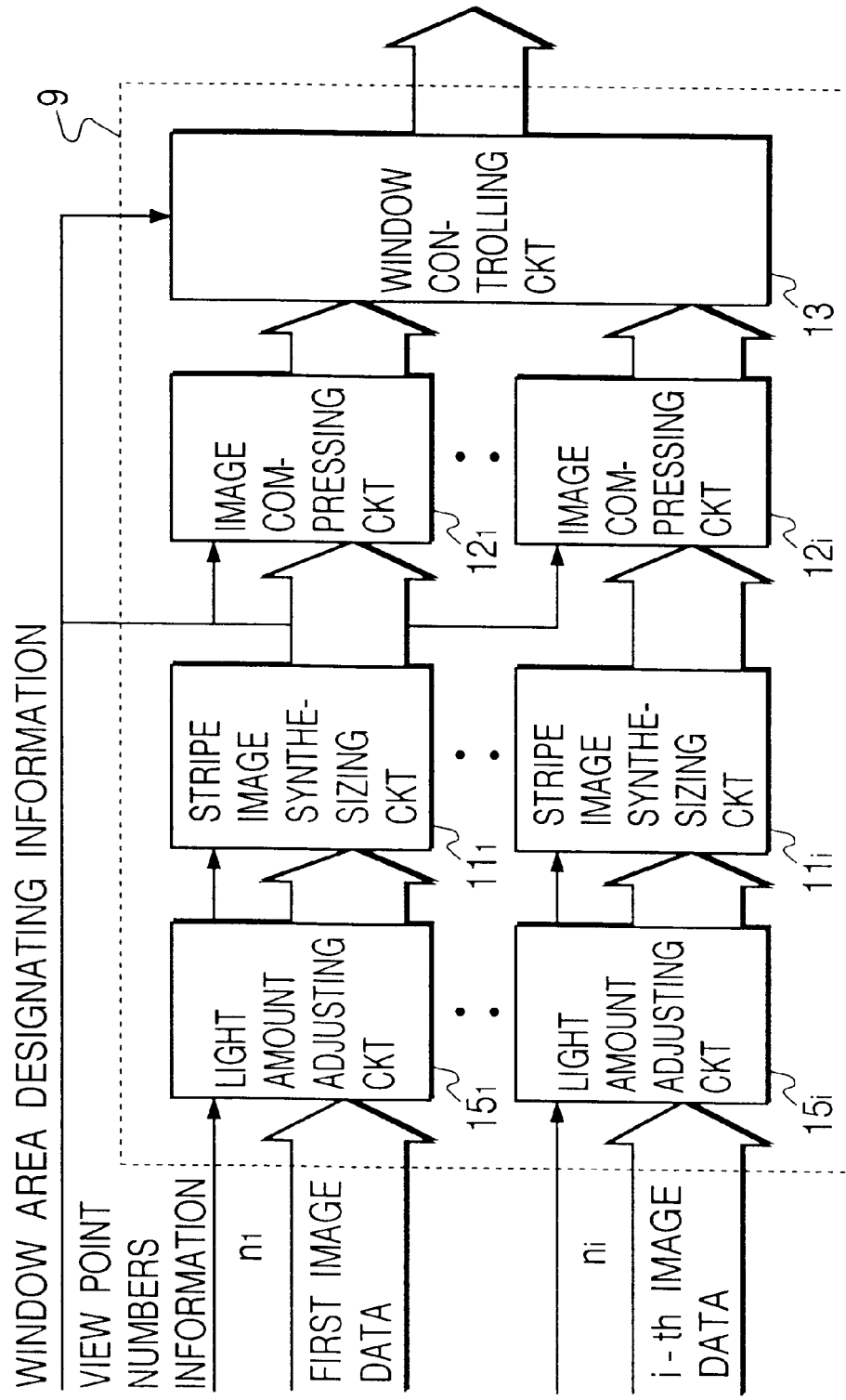
FIG. 8 is a schematic diagram showing the arrangement of a first image processing portion of the second embodiment.

FIG. 7 is a schematic diagram showing the arrangement of an image display apparatus according to the second embodiment of the present invention. FIG. 8 is a schematic diagram showing the arrangement of the first image processing portion 9 of the second embodiment. This embodiment has the following two differences from the first embodiment. That is, the display portion is constituted by arranging a light directivity controlling means (LCD 2) for displaying a partial parallax barrier and an image displaying means (LCD 1) for displaying a three-dimensional partial image from the backlight 3 toward the observer side, i.e., the display portion has a so-called rear barrier system in which the LCDs 1 and 2 replace each other in the first embodiment. In addition, the backlight 3 comprises a backlight that has uniform brightness, and instead, light amount adjusting circuits (light amount adjusting means) $15_i$ are added in the first image processing portion 9 to control the brightness of a partial image to be displayed on the LCD 1. Other arrangements are the same as those in the first embodiment.

The relationship between the two LCDs constituting the display portion of the apparatus of this embodiment will be described below with reference to FIG. 7. As in the description in the first embodiment (FIG. 1), let O be the interval (base length) between the two eyes of the observer, C be the observation distance of the LCD 1, D be the interval between the LCDs 1 and 2, B' be the width of each light-transmitting portion of a partial parallax barrier, and P be the pixel interval of stripe pixels displayed on the LCD 1. Then, in order to attain stereoscopic viewing, these parameters must satisfy the following relations:

$$D=P \cdot C/(O-P) \tag{1'}$$

$$B'=P \cdot (C+D)/C \tag{2'}$$

Note that the observation width has a finite divergence at the observation position in practice, and these quantities are set after they are slightly modified as in the arrangement of the first embodiment. Also, by appropriately changing the above-mentioned parameters, a stereoscopic image based on three or more view points can be displayed, needless to say.

Each of the light amount adjusting circuits $15_i$ arranged in the first image processing portion of this embodiment converts the luminance values of pixels in input image data in correspondence with the view point numbers information of the image data, and outputs the converted image data to the next stage. Therefore, each light amount adjusting circuit $15_i$ also serves as a luminance adjusting means.

The flow of processing in this embodiment will be described below with reference to FIGS. 7 and 8. The system controlling portion 18 inputs information associated with the number, sizes, positions, and the like of windows, i.e., window area designating information by controlling the window information inputting means 7. This information is output to the first and second image processing portions 9 and 10.

The system controlling portion 18 controls the image inputting and generating means 19 to generate or input a background image (partial image) and partial images to be displayed on the windows. At this time, if the partial image is a two-dimensional image, the means 19 generates or inputs one image data; if the partial image is a three-dimensional image, the means 19 generates or inputs parallax images corresponding to the view point number n. The input image has data indicating its view point number and a window to be displayed. An image data group including a plurality of such image data is parallelly input to the view point numbers detecting portion (view point numbers detecting means) 8.

The view point numbers detecting portion 8 detects view point numbers ni in units of image data, and parallelly outputs the detected view point numbers information ni to the first image processing portion 9 together with the image data. Also, the view point numbers detecting portion 8 outputs the detected view point numbers information ni to the second image processing portion 10.

The operation in the first image processing portion 9 will be described below. Each of the light amount adjusting circuits $15_i$ appropriately converts the luminance upon displaying image data on the basis of the view point numbers information, and outputs the converted data to a corresponding one of the stripe image synthesizing circuits $11_i$. For example, when an image data group input to the first image processing portion 9 includes three different types of images, i.e., a 1-view point partial image, a 2-view point partial image, and a 3-view point partial image, and these image data have a maximum brightness level "100", the luminance values in units of pixels of the 3-view point partial image are left unchanged, the luminance values in units of pixels of the 2-view point partial image are converted to have values 70% of the original values, and the luminance values in units of pixels of the 1-view point partial image are converted to have values 40% of the original values. Thereafter, these image data are output to the corresponding stripe image synthesizing circuits $11_i$.

If each of the stripe image synthesizing circuits $11_i$ determines based on the image data and the view point numbers information ni of the image data that the input image data is a three-dimensional image (the view point number $n \geq 2$), the circuit $11_i$ divides ni parallax image data into a plurality of stripe pixels, forms a single stripe image by alternately arranging the stripe pixels in a predetermined order, and outputs the stripe image to the next stage. If the input image data is a two-dimensional image data (the view point number n=1), the circuit $11_i$ directly outputs the image data to the next stage. Each of the image compressing circuits $12_i$ compresses the image data output from the previous stage to the corresponding window size on the basis of the window area designating information, and outputs the compressed image data to the window controlling circuit 13.

The window controlling circuit 13 receives the image data compressed to the corresponding window sizes from the respective image compressing circuits $12_i$, forms image information for one screen by appropriately determining the layout of these image data on the basis of the window area designating information, and outputs the formed image information to the LCD 1 drive circuit 5. The LCD 1 drive circuit 5 drives the LCD 1 on the basis of the image information, and displays an image, on which the respective partial images are inserted in the corresponding windows, on the display screen of the LCD 1.

At this time, since the luminance values in units of pixels of the respective partial images have already been converted in correspondence with their view point numbers in the corresponding light amount adjusting circuits $15_i$, a partial image having luminance values falling within the range from 0 to 40 is formed on an area where a 1-view point partial image is to be displayed, a partial image having luminance values falling within the range from 0 to 70 is formed on an area where a 2-view point partial image is to be displayed, and a partial image having luminance values falling within the range from 0 to 100 is formed on an area where a 3-view point partial image is to be displayed.

The second image processing portion 10 receives the view point numbers information ni and the window area designating information, generates image data of partial PBs corresponding to three-dimensional partial images to be displayed on the LCD 1, and outputs them to the LCD 2 drive circuit 4. The LCD 2 drive circuit 4 drives the LCD 2 on the basis of the input image data, and forms partial PBs at appropriate positions on the display screen of the LCD 2.

By controlling the time required from the generating/inputting operations of images to their output operations, so that the partial image display operation on the LCD 1 and the partial PB display operation on the LCD 2 are performed at the same time, the luminance of the entire screen can be appropriately maintained even when three- and two-dimensional partial images are displayed together on the screen.

In this embodiment, since the LCD 1 is illuminated with light emitted by the backlight having uniform brightness, and each partial image is displayed on the LCD 1 by controlling the luminance values in units of pixels of the partial image in correspondence with its view point number ni by the light amount adjusting means, the brightness levels of partial images to be observed by the observer can be maintained to be nearly constant. Even when the display state is switched to the full-screen display state of a two- or three-dimensional image, the luminance range on the entire screen can be maintained to be substantially constant by the method described in the first embodiment.

According to the arrangement of this embodiment, since the need for performing the light amount control of the divided areas of the backlight can be obviated, and the movement of the window and the change in size of the window are not limited by the divided area size of the backlight unlike in the first embodiment, the movement of the window and the change in size of the window can always be smoothly performed.

In the first embodiment, the display portion adopts the front barrier type arrangement, and its brightness adjustment is attained by adjusting the light emission amount of the backlight, while in the second embodiment, the display portion adopts the rear barrier type arrangement, and its brightness adjustment is attained by adjusting the luminance values in units of pixels of each partial image. In this case, the same brightness adjustment as in the first embodiment may be performed in the arrangement of the display portion of the second embodiment, while the same brightness adjustment as in the second embodiment may be performed in the arrangement of the display portion of the first embodiment. However, a further description thereof will not be made to avoid redundancy.

Figure 9:
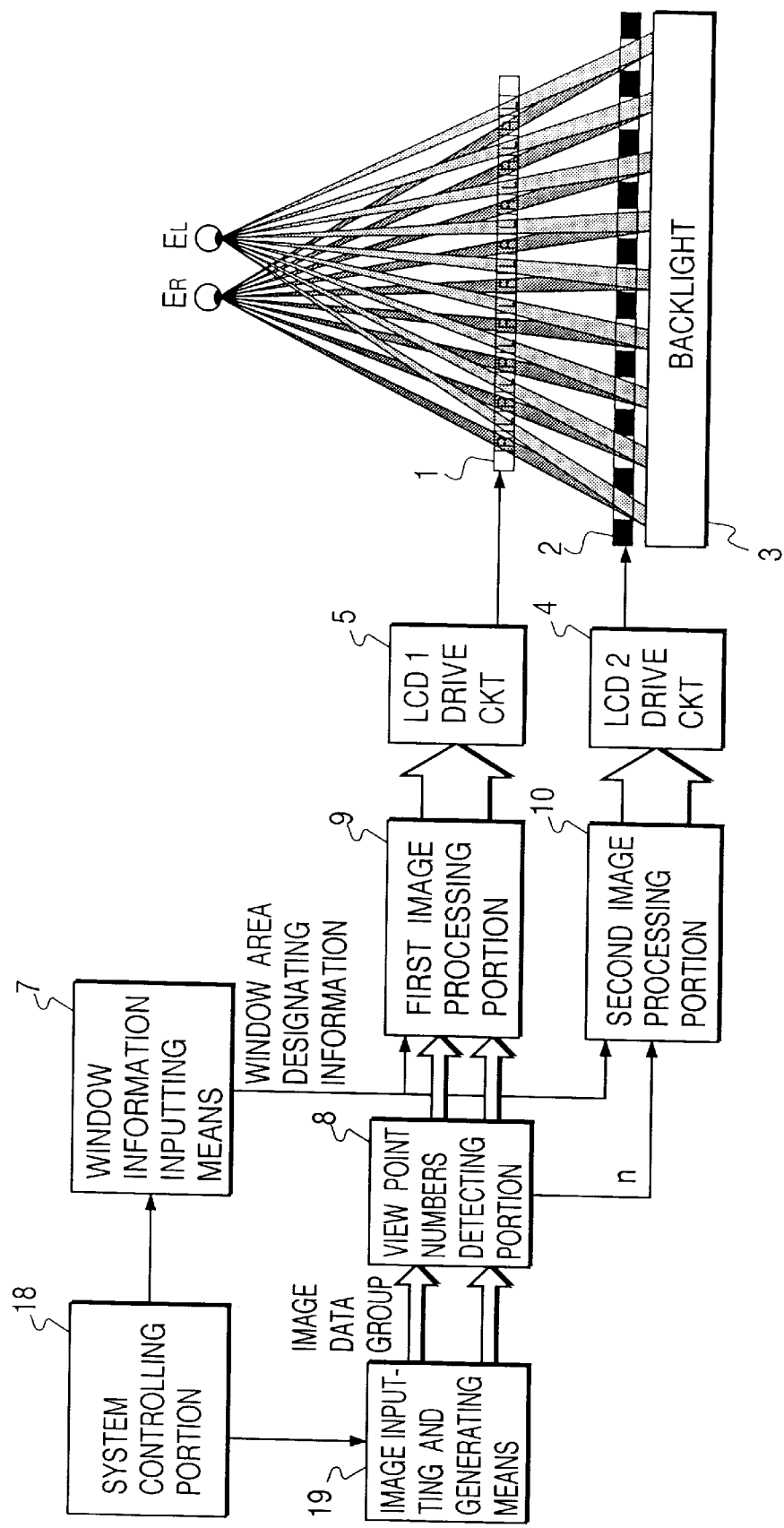
FIG. 9 is a schematic diagram showing the arrangement of an image display apparatus according to the third embodiment of the present invention.
Figure 10:
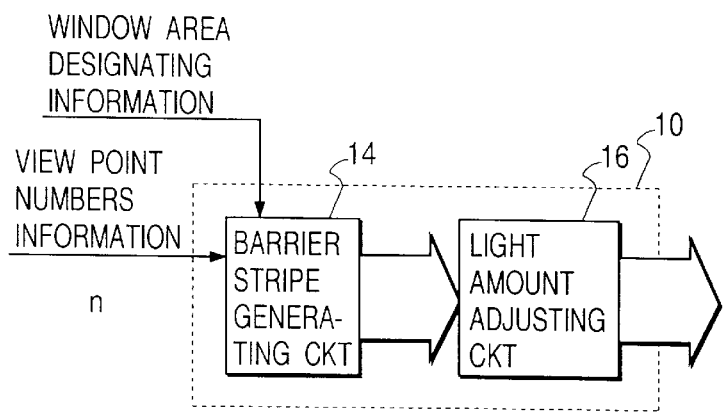
FIG. 10 is a schematic diagram showing the arrangement of a second image processing portion of the third embodiment.

FIG. 9 is a schematic diagram showing the arrangement of an image display apparatus according to the third embodiment of the present invention. FIG. 10 is a schematic diagram showing the arrangement of the circuit of the second image processing portion 10 of the third embodiment.

In this embodiment, the difference from the second embodiment is that the first image processing portion 9 has no light amount adjusting circuits $15_i$, and instead, a light amount adjusting circuit (light amount adjusting means) 16 is added in the second image processing portion 10. Other arrangements are the same as those in the second embodiment. The light amount adjusting circuit 16 changes the transmittance of the light-transmitting portions in each partial PB corresponding to a partial image on the basis of the view point numbers information of the partial image.

The flow of processing in this embodiment will be described below with reference to FIGS. 9 and 10. The system controlling portion 18 inputs information associated with the number, sizes, positions, and the like of windows, i.e., window area designating information by controlling the window information inputting means 7. This information is output to the first and second image processing portions 9 and 10.

The system controlling portion 18 controls the image inputting and generating means 19 to generate or input a background image (partial image) and partial images to be displayed on the windows. At this time, if the partial image is a two-dimensional image, the means 19 generates or inputs one image data; if the partial image is a three-dimensional image, the means 19 generates or inputs parallax images corresponding to the view point number n. The input image has data indicating its view point number and a window to be displayed. An image data group including a plurality of such image data is parallelly input to the view point numbers detecting portion 8.

The view point numbers detecting portion 8 detects view point numbers ni in units of image data, and parallelly outputs the detected view point numbers information ni to the first image processing portion 9 together with the image data. Also, the view point numbers detecting portion 8 outputs the detected view point numbers information ni to the second image processing portion 10.

The operation in the first image processing portion 9 will be explained below. If each of the stripe image synthesizing circuits $11_i$ determines based on the image data and the view point numbers information ni of the image data that the input image data is a three-dimensional image (the view point number $n \geq 2$), the circuit $11_i$ divides ni parallax image data into a plurality of stripe pixels, forms a single stripe image by alternately arranging the stripe pixels in a predetermined order, and outputs the stripe image to the next stage. If the input image data is a two-dimensional image data (the view point number n=1), the circuit $11_i$ directly outputs the image data to the next stage. Each of the image compressing circuits $12_i$ compresses the image data output from the previous stage to the corresponding window size on the basis of the window area designating information, and outputs the compressed image data to the window controlling circuit 13.

The window controlling circuit 13 receives the image data compressed to the corresponding window sizes from the respective image compressing circuits $12_i$, forms image information for one screen by appropriately determining the layout of these image data on the basis of the window area designating information, and outputs the formed image information to the LCD 1 drive circuit 5. The LCD 1 drive circuit 5 drives the LCD 1 on the basis of the image information, and displays an image on the display screen of the LCD 1.

The second image processing portion 10 generates image data of a partial PB constituted by light-transmitting portions and light-shielding portions to be displayed on the LCD 2 on the basis of the view point numbers information ni and the window area designating information from the view point numbers detecting portion 8, and outputs the generated image data to the light amount adjusting circuit 16.

The light amount adjusting circuit 16 changes the transmittance of the light-transmitting portions of the image data (changes the display density) in correspondence with the view point numbers information ni, and outputs the image data to the LCD 2 drive circuit 4. The LCD 2 drive circuit 4 drives the LCD 2 on the basis of the image data to form, on the screen of the LCD 2, partial PBs constituted by light-transmitting portions of different transmittances in correspondence with the view point numbers of the partial images displayed on the LCD 1.

Figures 11A, 11B:
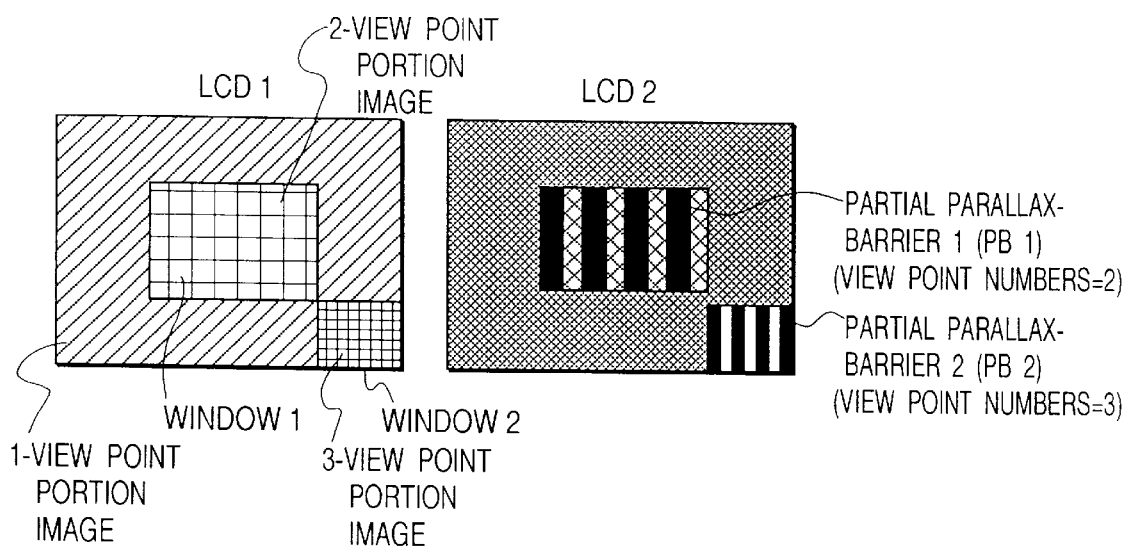
FIGS. 11A and 11B are views showing display examples on two LCDs of the third embodiment.

FIGS. 11A and 11B show display examples of the LCDs 1 and 2 in this embodiment. The LCD 1 displays a 1-view point partial image as a background image, and also displays window 1 for a 2-view point partial image and window 2 for a 3-view point partial image.

The LCD 2 displays partial PB 1 corresponding to two view points on an area corresponding to the 2-view point partial image (window 1) on the LCD 1 and partial PB 2 corresponding to three view points on an area corresponding to the 3-view point partial image (window 2) on the LCD 1. The light-transmitting portions and light-shielding portions of partial PB 2 are set so that light can be focused at three predetermined observation positions on the observer side via stripe pixels constituting the 3-view point partial image. On the other hand, the light-transmitting portions and light-shielding portions of partial PB 1 are set so that light can be focused at two predetermined observation positions on the observer side via stripe pixels constituting the 2-view point partial image. The transmittance of the light-transmitting portions of the partial PB 1 corresponding to the 2-view point partial image is set to be 70% of that of the partial PB 2 corresponding to the 3-view point partial image. Also, the transmittance of the light-transmitting portions of the partial PB corresponding to the 1-view point partial image is set to be 40% of that of the partial PB 2 corresponding to the 3-view point partial image.

By controlling the time required from the generating/inputting operations of images to their output operations, so that the partial image display operation on the LCD 1 and the partial PB display operation on the LCD 2 are performed at the same time, the luminance of the entire screen can be appropriately maintained even when three- and two-dimensional partial images are displayed together on the screen.

In this embodiment, since the transmittance of the light-transmitting portions of a partial PB to be displayed on the LCD 2 is adjusted by the light amount adjusting means in correspondence with the view point number of the corresponding partial image, the brightness levels of partial images to be observed by the observer can always be maintained to be substantially constant when three- and two-dimensional partial images are displayed together on the screen.

Even when the display state is switched to the full-screen display state of a two- or three-dimensional image, the luminance range on the entire screen can be maintained to be substantially constant by the method described in the first embodiment.

According to the arrangement of this embodiment, since the movement of a window and the change in size of the window can be attained in units of pixels of the LCD 2 as compared to the arrangement of the first embodiment, the movement of a window and the change in size of the window can always be smoothly attained.

Also, the arrangement of this embodiment is simpler than that of the second embodiment since the number of constituting circuits can be reduced.

In addition, since a partial image displayed on the LCD 1 is observed via light transmitted through the LCD 2, the number of gradation levels that can be expressed by the LCD 1 for displaying an image does not change, and higher gradation expression can be obtained.

In the third embodiment, the display portion is constituted by arranging the LCD 2 and the LCD 1 from the backlight 3 side, and the brightness adjustment of a partial image is executed by adjusting the transmittance of the light-transmitting portions of a partial PB displayed on the LCD 2. Also, the same brightness adjustment as in this embodiment may be performed in the arrangement of the display portion of the first embodiment.

Figure 12:
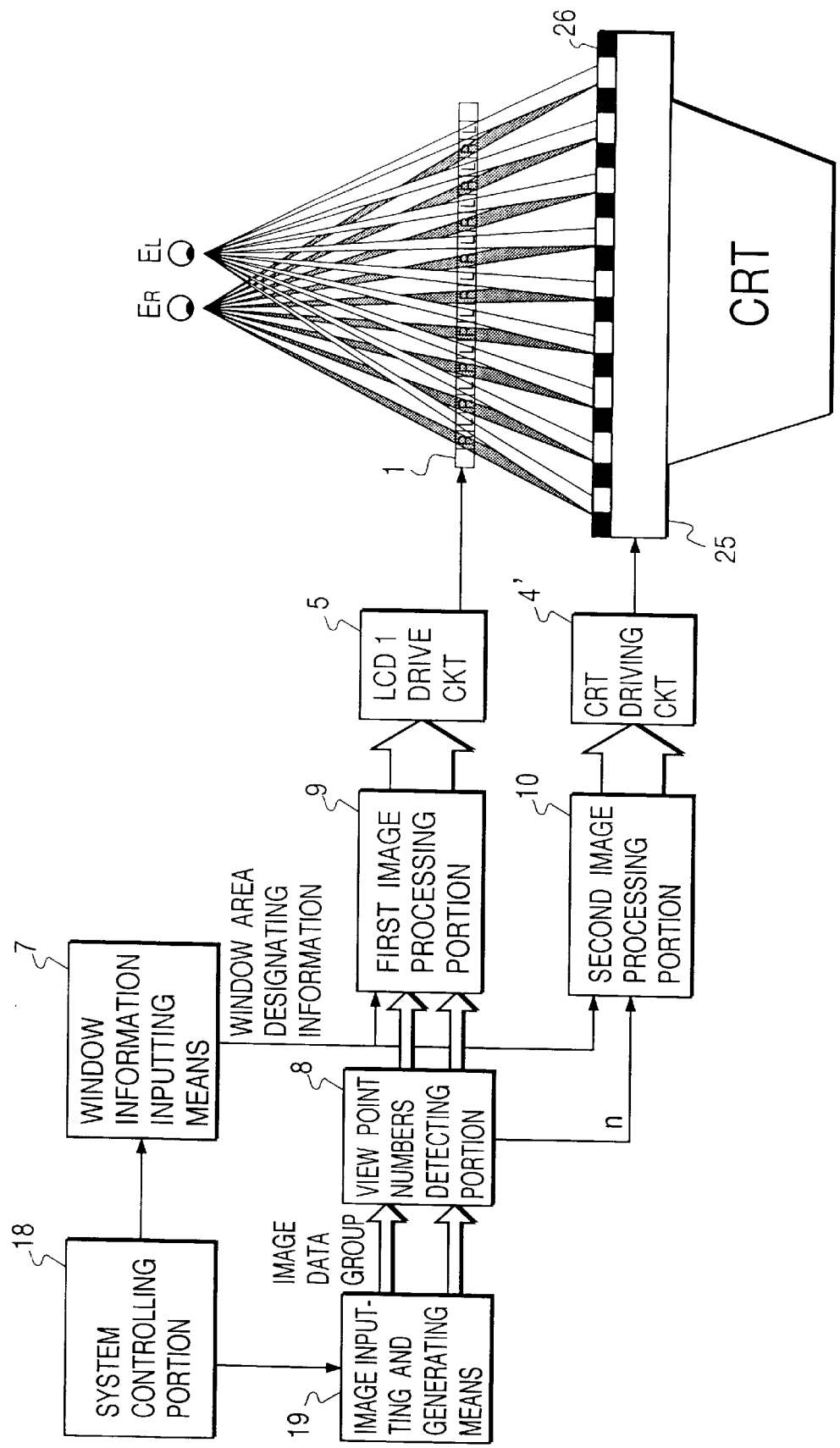
FIG. 12 is a schematic diagram showing the arrangement of an image display apparatus according to the fourth embodiment of the present invention.

FIG. 12 is a schematic diagram showing the arrangement of a stereoscopic image display apparatus according to the fourth embodiment of the present invention. In this embodiment, the difference from the third embodiment is that a self-emitting type element 25 is used in place of the LCD 2 and the backlight 3 of the third embodiment, and a CRT driving circuit 4' is arranged in place of the drive circuit 4. This embodiment uses a CRT as the self-emitting type element 25. In this embodiment, a partial parallax barrier is formed by alternately arranging stripe-shaped light-emitting portions and non-light-emitting portions on an area, corresponding to a partial image, on the tube surface of the CRT 25. The CRT 25 has a function of a light directivity controlling means.

The flow of processing in this embodiment will be described below with reference to FIG. 12. The first image processing portion 9 of this embodiment is the one from which the light amount adjusting circuits 15$_i$ are excluded from that of the second embodiment (see FIG. 8). The second image processing portion 10 of this embodiment is the same as that of the third embodiment, and FIG. 10 is a schematic diagram showing its arrangement. The system controlling portion 18 inputs information associated with the number, sizes, positions, and the like of windows, i.e., window area designating information by controlling the window information inputting means 7. This information is output to the first and second image processing portions 9 and 10.

The system controlling portion 18 controls the image inputting and generating means 19 to generate or input a background image (partial image) and partial images to be displayed on the windows. At this time, if the partial image is a two-dimensional image, the means 19 generates or inputs one image data; if the partial image is a three-dimensional image, the means 19 generates or inputs parallax images corresponding to the view point number n. The input image has data indicating its view point number and a window to be displayed. An image data group including a plurality of such image data is parallelly input to the view point numbers detecting portion 8.

The view point numbers detecting portion 8 detects view point numbers ni in units of image data, and parallelly outputs the detected view point numbers information ni to the first image processing portion 9 together with the image data. Also, the view point numbers detecting portion 8 outputs the detected view point numbers information ni to the second image processing portion 10.

The operation in the first image processing portion 9 will be explained below (see FIG. 8). If each of the stripe image synthesizing circuits 11$_i$ determines based on the image data and the view point numbers information ni of the image data that the input image data is a three-dimensional image (the view point number n≧2), the circuit 11$_i$ divides ni parallax image data into a plurality of stripe pixels, forms a single stripe image by alternately arranging the stripe pixels in a predetermined order, and outputs the stripe image to the next stage. If the input image data is a two-dimensional image data (the view point number n=1), the circuit 11$_i$ directly outputs the image data to the next stage. Each of the image compressing circuits 12$_i$ compresses the image data output from the previous stage to the corresponding window size on the basis of the window area designating information, and outputs the compressed image data to the window controlling circuit 13.

The window controlling circuit 13 receives the image data compressed to the corresponding window sizes from the respective image compressing circuits 12$_i$, forms image information for one screen by appropriately determining the layout of these image data on the basis of the window area designating information, and outputs the formed image information to the LCD 1 drive circuit 5. The LCD 1 drive circuit 5 drives the LCD 1 on the basis of the image information, and displays a synthesized image on the display screen of the LCD 1.

The second image processing portion 10 generates image data of a partial PB constituted by light-emitting portions and non-light-emitting portions to be displayed on a tube surface 26 of the CRT 25 on the basis of the view point numbers information ni and the window area designating information from the view point numbers detecting portion 8, and outputs the generated image data to the light amount adjusting circuit 16.

The light amount adjusting circuit 16 changes the luminance value of the light-emitting portions in the image data (changes the display density) in correspondence with the view point numbers information ni, and outputs the image data to the CRT driving circuit 4'. The CRT driving circuit 4' drives the CRT 25 on the basis of the image data to form, on the tube surface of the CRT 25, partial PBs constituted by light-emitting portions of different luminance values in correspondence with the view point numbers of the partial images displayed on the LCD 1.

Figures 13A, 13B:
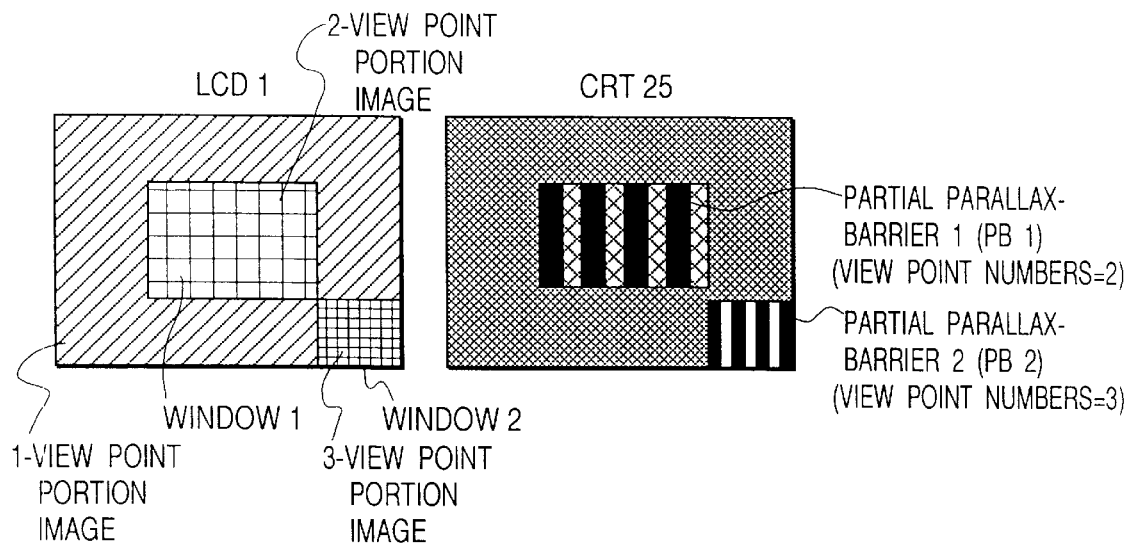
FIGS. 13A and 13B are views showing display examples on a CRT and an LCD of the fourth embodiment.
Figure 15:
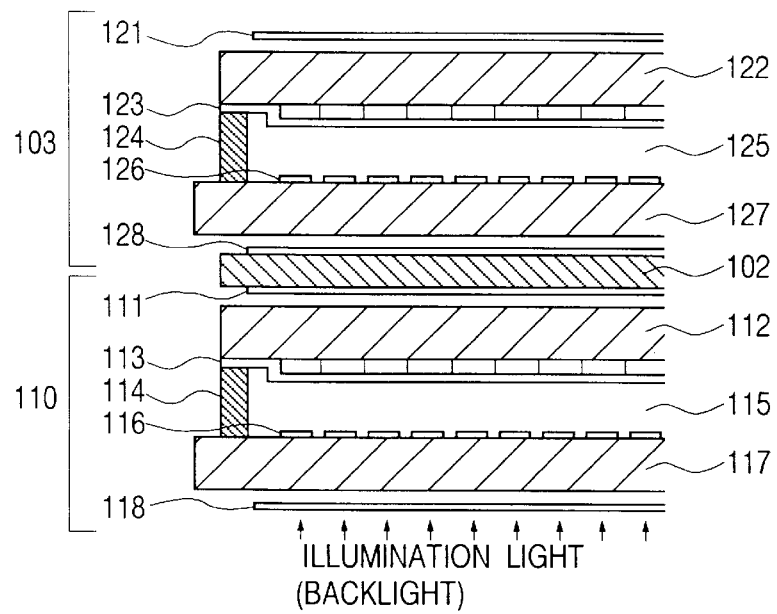
FIG. 15 is a sectional view showing the arrangement of a display portion of the conventional stereoscopic image display apparatus.
Figure 14:
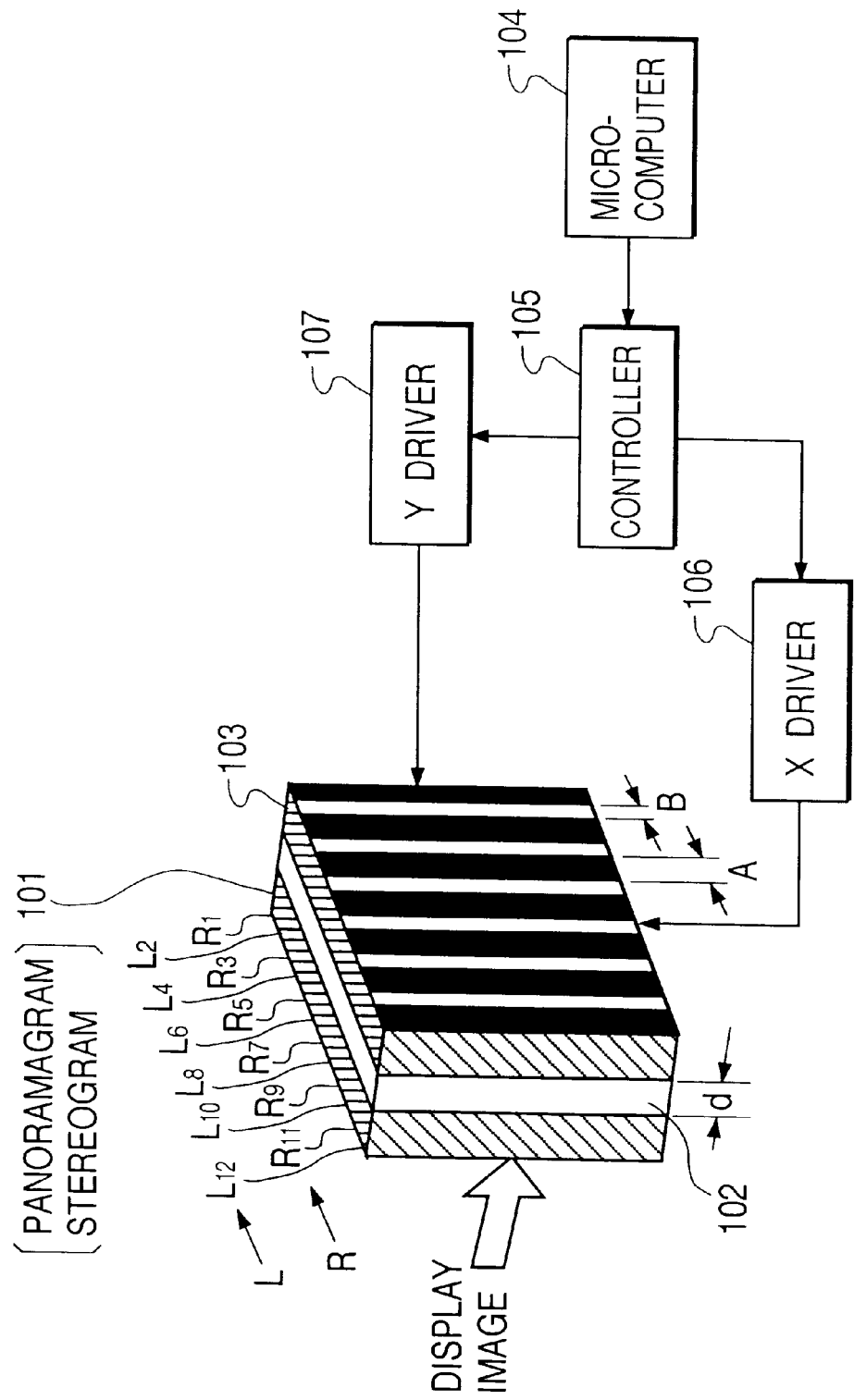
FIG. 14 is a schematic diagram showing the arrangement of a conventional stereoscopic image display apparatus.
Figure 17A:
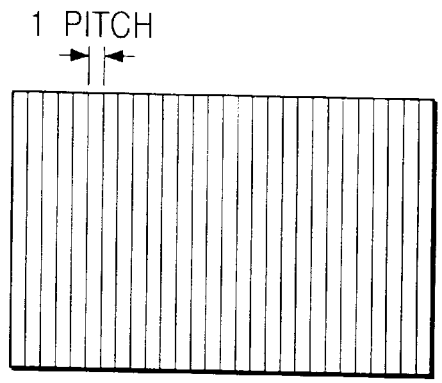
FIGS. 17A and 17B are views showing an electronic parallax barrier upon displaying two- and three-dimensional partial images together in the conventional stereoscopic image display apparatus.
Figure 17B:
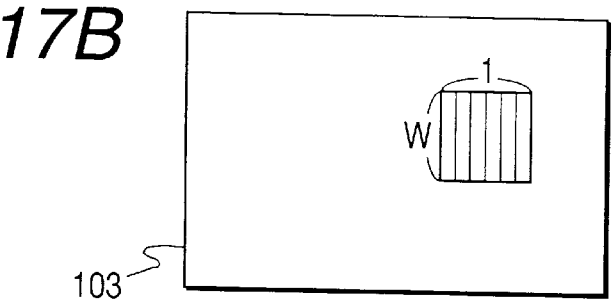

FIGS. 13A and 13B show display examples of the CRT 25 and the LCD 1 in this embodiment. The LCD 1 displays a 1-view point partial image as a background image, and also displays window 1 for a 2-view point partial image and window 2 for a 3-view point partial image.

The CRT 25 displays partial PB 1 corresponding to two view points on an area corresponding to the 2-view point partial image (window 1) on the LCD 1 and partial PB 2 corresponding to three view points on an area corresponding to the 3-view point partial image (window 2) on the LCD 1. The light-emitting portions and non-light-emitting portions of partial PB 2 are set so that light can be focused at predetermined three observation positions on the observer side via stripe pixels constituting the 3-view point partial image. On the other hand, the light-emitting portions and non-light-emitting portions of partial PB 1 are set so that light can be focused at predetermined two observation positions on the observer side via stripe pixels constituting the 2-view point partial image. The luminance value of light-emitting portions of the partial PB 1 corresponding to the 2-view point partial image is set to be 70% of that of the partial PB 2 corresponding to the 3-view point partial image. Also, the luminance value of light-emitting portions of the partial PB corresponding to the 1-view point partial image is set to be 40% of that of the partial PB 2 corresponding to the 3-view point partial image.

By controlling the time required from the generating/inputting operations of images to their output operations, so that the partial image display operation on the LCD 1 and the partial PB display operation on the CRT 25 are performed at the same time, the luminance of the entire screen can be appropriately maintained even when three- and two-dimensional partial images are displayed together on the screen.

In this embodiment, since the luminance value of the light-emitting portions of a partial PB displayed on the CRT 25 is controlled by the light amount adjusting means in correspondence with the view point number of the corresponding partial image, the brightness levels of partial images to be observed by the observer can always be maintained to be substantially constant when three- and two-dimensional partial images are displayed together on the screen.

Even when the display state is switched to the full-screen display state of a two- or three-dimensional image, the luminance range on the entire screen can be maintained to be substantially constant by the method described in the first embodiment.

In the fourth embodiment, the display portion is constituted by the LCD 1 serving as the image displaying means and the CRT 25 serving as the light directivity controlling means. In addition, the CRT 25 may be used in place of the backlight 3 and the LCD 2 in the second embodiment, and the CRT 25 may be used in place of the backlight 3 and the LCD 1 in the first embodiment. However, a repetitive description thereof will be avoided here.

As described above, the arrangement of the display portion, the combination of the display method and the light amount adjusting means, and the like described in the above embodiments are not particularly limited, and combinations described in the scope of the claims of the present invention are available.

What is claimed is:

1. An image display method comprising the steps of:
   defining an image obtained from one view point as a two-dimensional image;
   defining, as a three-dimensional image, a stripe image formed by dividing each of a plurality of parallax images from a plurality of view points into a plurality of stripe pixels and arranging the plurality of stripe pixels in a predetermined order;
   displaying, on image displaying means, the two-dimensional image and the three-dimensional image together as a two-dimensional partial image and a three-dimensional partial image, or displaying a plurality of three-dimensional images with different view point numbers together as three-dimensional partial images;
   allowing an observer to stereoscopically view the three-dimensional partial image by guiding a light beam coming from the three-dimensional partial image to a predetermined position via a partial parallax barrier, which is formed by light directivity controlling means, arranged to oppose said image displaying means, by alternately arranging stripe-shaped light-transmitting portions and light-shielding portions on an area corresponding to the three-dimensional partial image; and
   controlling, using light amount adjusting means, brightness levels of the partial images to be observed by the observer in correspondence with view point numbers of the partial images.

2. A method according to claim 1, wherein the controlling step includes the step of setting the brightness levels of the partial images to be substantially equal to each other.

3. A method according to claim 1, further comprising the step of changing a pattern of the partial parallax barrier in correspondence with the view point number of the three-dimensional partial image.

4. A method according to claim 3, wherein illuminating means for illuminating said image displaying means illuminates by dividing an illumination surface thereof into a plurality of divided areas, and said method further comprises the step of adjusting, using said light amount adjusting means, light emission amounts of said illuminating means in units of divided areas.

5. A method according to claim 4, further comprising the step of substantially superposing boundary lines of the partial images and boundary lines of the parallax barrier on dividing lines of the divided areas.

6. A method according to claim 3, wherein said image displaying means comprises a first light modulation panel, which is illuminated by illuminating means, and said method further comprises the steps of controlling, using said light amount adjusting means, a luminance value of said first light modulation panel in correspondence with the view point number of the partial image.

7. A method according to claim 3, wherein said image displaying means comprises a self-emitting type display element, and said method further comprises the step of controlling, using said light amount adjusting means, a luminance value of said self-emitting type display element in correspondence with the view point number of the partial image.

8. A method according to claim 3, wherein said light directivity controlling means comprises a second light modulation panel, and said method further comprises the step of controlling, using said light amount adjusting means, a transmittance of the light-transmitting portions of the partial parallax barrier in correspondence with the view point number of the corresponding partial image.

9. A method according to claim 3, wherein said image displaying means comprises a first light modulation panel, which is illuminated by illuminating means, said light directivity controlling means comprises a second light modulation panel, and said method further comprises the step of controlling, using said light amount adjusting means, a transmittance of the light-transmitting portions of the partial parallax barrier in correspondence with the view point number of the corresponding partial image.

10. A method according to claim 2, further comprising the step of maintaining, using said light amount adjusting means, the brightness levels of the partial images to be substantially constant when an image displayed on said image displaying means is switched to another image.

11. A method according to claim 2, further comprising the step of performing light amount adjustment after an image displayed on said image displaying means is switched to another image so as to maximize the brightness level, after the switching operation, to be visually recognized by the observer in the image displayed on said image displaying means when a total number of partial images displayed after the switching operation is 1.

12. A method according to claim 11, further comprising the step of performing light amount adjustment after an image displayed on said image displaying means is switched to another image so as to gradually maximize the brightness level, after the switching operation, to be visually recognized by the observer in the image displayed on said image displaying means a predetermined period of time after the switching operation of the image when the brightness level to be visually recognized by the observer before and after the switching operation changes.

13. An image display method comprising the steps of:
defining an image obtained from one view point as a two-dimensional image;
defining, as a three-dimensional image, a stripe image formed by dividing each of a plurality of parallax images from a plurality of view points into a plurality of stripe pixels and arranging the plurality of stripe pixels in a predetermined order;
displaying, on image displaying means, the two-dimensional image and the three-dimensional image together as a two-dimensional partial image and a three-dimensional partial image, or displaying a plurality of three-dimensional images with different view point numbers together as three-dimensional partial images;
allowing an observer to stereoscopically view the three-dimensional partial image by guiding to a predetermined position, via the three-dimensional partial image, a light beam coming from a partial parallax barrier, which is formed by light directivity controlling means, arranged to oppose said image displaying means, by alternately arranging stripe-shaped light-transmitting portions and light-shielding portions on an area corresponding to the three-dimensional partial image; and
controlling, using light amount adjusting means, brightness levels of the partial images to be observed by the observer in correspondence with view point numbers of the partial images.

14. A method according to claim 13, wherein the controlling step includes the step of setting the brightness levels of the partial images to be substantially equal to each other.

15. A method according to claim 13, further comprising the step of changing a pattern of the partial parallax barrier in correspondence with the view point number of the three-dimensional partial image.

16. A method according to claim 15, wherein illuminating means for illuminating said image displaying means illuminates the illumination surface thereof into a plurality of divided areas, and said method further comprises the step of adjusting, using said light amount adjusting means, light emission amounts of said illuminating means in units of divided areas.

17. A method according to claim 16, further comprising the step of substantially superposing boundary lines of the partial images and boundary lines of the parallax barrier on dividing lines of the divided areas.

18. A method according to claim 15, wherein said image displaying means comprises a first light modulation panel, and said method further comprises the steps of controlling, using said light amount adjusting means, a luminance value of said first light modulation panel in correspondence with the view point number of the partial image.

19. A method according to claim 15, wherein said light directivity controlling means comprises a second light modulation panel, and said method further comprises the step of controlling, using said light amount adjusting means, a transmittance of the light-transmitting portions of the partial parallax barrier in correspondence with the view point number of the corresponding partial image.

20. A method according to claim 14, further comprising the step of maintaining, using said light amount adjusting means, the brightness levels of the partial images to be substantially constant when an image displayed on said image displaying means is switched to another image.

21. A method according to claim 14, further comprising the step of performing light amount adjustment after an image displayed on said image displaying means is switched to another image so as to maximize the brightness level, after the switching operation, to be visually recognized by the observer in the image displayed on said image displaying means when a total number of partial images displayed after the switching operation is 1.

22. A method according to claim 21, further comprising the step of performing light amount adjustment after an image displayed on said image displaying means is switched to another image so as to gradually maximize the brightness level, after the switching operation, to be visually recognized by the observer in the image displayed on said image displaying means a predetermined period of time after the switching operation of the image when the brightness level to be visually recognized by the observer before and after the switching operation changes.

23. An image display method comprising the steps of:
defining an image obtained from one view point as a two-dimensional image;
defining, as a three-dimensional image, a stripe image formed by dividing each of a plurality of parallax images from a plurality of view points into a plurality of stripe pixels and arranging the plurality of stripe pixels in a predetermined order;
displaying, on image displaying means, the two-dimensional image and the three-dimensional image together as a two-dimensional partial image and a three-dimensional partial image, or displaying a plurality of three-dimensional images with different view point numbers together as three-dimensional partial images;
allowing an observer to stereoscopically view the three-dimensional partial image by guiding to a predetermined position, via the three-dimensional partial image, a light beam coming from a partial parallax barrier, which is formed by light directivity controlling means, arranged to oppose said image displaying means and constituted by a plurality of self-emitting type elements, by alternately arranging stripe-shaped light-emitting portions and non-light-emitting portions on an area corresponding to the three-dimensional partial image; and
controlling, using light amount adjusting means, brightness levels of the partial images to be observed by the observer in correspondence with view point numbers of the partial images.

24. A method according to claim 23, wherein the controlling step includes the step of setting the brightness levels of the partial images to be substantially equal to each other.

25. A method according to claim 23, further comprising the step of changing a pattern of the partial parallax barrier in correspondence with the view point number of the three-dimensional partial image.

26. A method according to claim 25, further comprising the step of controlling, using said light amount adjusting means, a luminance value of the light-emitting portions of the parallax barrier in correspondence with the view point number of the partial image.

27. A method according to claim 24, further comprising the step of maintaining, using said light amount adjusting means, the brightness levels of the partial images to be substantially constant when an image displayed on said image displaying means is switched to another image.

28. A method according to claim 24, further comprising the step of performing light amount adjustment after an image displayed on said image displaying means is switched to another image so as to maximize the brightness level, after the switching operation, to be visually recognized by the observer in the image displayed on said image displaying means when a total number of partial images displayed after the switching operation is 1.

29. A method according to claim 28, further comprising the step of performing light amount adjustment after an image displayed on said image displaying means is switched to another image so as to gradually maximize the brightness level, after the switching operation, to be visually recognized by the observer in the image displayed on said image displaying means a predetermined period of time after the switching operation of the image when the brightness level to be visually recognized by the observer before and after the switching operation changes.

30. An image display method comprising the steps of:

displaying, on image displaying means, a two-dimensional image and a three-dimensional image together as a two-dimensional partial image and a three-dimensional partial image, or displaying a plurality of three-dimensional images with different view point numbers together as three-dimensional partial images;

allowing an observer to stereoscopically view the three-dimensional partial by guiding a light beam coming from the three-dimensional partial image to a predetermined position via light directivity controlling means, arranged to oppose said image display means, by arranging light-transmitting portions and light-shielding portions in a predetermined order on an area corresponding to the three-dimensional partial image; and controlling, using light amount adjusting means, brightness levels of the partial images to be observed by the observer in correspondence with view point numbers of the partial images.

31. The method according to claim 30, wherein the controlling step includes the step of setting the brightness levels of the partial images to be substantially equal to each other.

32. The method according to claim 31, further comprising the step of performing light amount adjustment after an image displayed on said image displaying means is switched to another image so as to maximize the brightness level, after the switching operation, to be visually recognized by the observer in the image displayed on said image displaying means when a total number of partial images displayed after the switching operation is 1.

33. An image display method comprising the steps of:

displaying, on image displaying means, a two-dimensional image and a three-dimensional image together as a two-dimensional partial image and a three-dimensional partial image, or displaying a plurality of three-dimensional images with different view point numbers together as three-dimensional partial images;

allowing an observer to stereoscopically view the three-dimensional partial image by guiding to a predetermined position, via the three-dimensional partial image, a light beam coming from light directivity controlling means, arranged to oppose said image displaying means, by arranging light-transmitting portions and light-shielding portions in a predetermined order on an area corresponding to the three-dimensional partial image; and controlling, using light amount adjusting means, brightness levels of the partial images to be observed by the observer in correspondence with view point numbers of the partial images.

34. The method according to claim 33, wherein the controlling step includes the step of setting the brightness levels of the partial images to be substantially equal to each other.

35. The method according to claim 34, further comprising the step of performing light amount adjustment after an image displayed on said image displaying means is switched to another image so as to maximize the brightness level, after the switching operation, to be visually recognized by the observer in the image displayed on said image displaying means when a total number of partial images displayed after the switching operation is 1.

36. An image display method comprising the steps of:

displaying, on image displaying means, a two-dimensional image and a three-dimensional image together as a two-dimensional partial image and a three-dimensional partial image, or displaying a plurality of three-dimensional images with different view point numbers together as three-dimensional partial images;

allowing an observer to stereoscopically view the three-dimensional partial image by guiding to a predetermined position, via the three-dimensional partial image, a light beam coming from light directivity controlling means, arranged to oppose said image displaying means, by arranging light-emitting portions and non-light-emitting portions in a predetermined order on an area corresponding to the three-dimensional partial image; and controlling, using light amount adjusting means, brightness levels of the partial images to be observed by the observer in correspondence with view point numbers of the partial images.

37. The method according to claim 36, wherein the controlling step includes the step of setting the brightness levels of the partial images to be substantially equal to each other.

38. The method according to claim 37, further comprising the step of performing light amount adjustment after an image displayed on said image displaying means is switched to another image so as to maximize the brightness level, after the switching operation, to be visually recognized by the observer in the image displayed on said image displaying means when a total number of partial images displayed after the switching operation is 1.

* * * * *

UNITED STATES PATENT AND TRADEMARK OFFICE
CERTIFICATE OF CORRECTION

PATENT NO. : 5,945,965

DATED : August 31, 1999

INVENTOR(S) : Kazutaka Inoguchi et al.

It is certified that error appears in the above-identified patent and that said Letters Patent is hereby corrected as shown below:

Col. 9, line 57, delete "$\underline{n\geq 2}$" and insert therefore -- $n\geq 2$ --.

Col. 11, line 35, delete "$\underline{n\geq 2}$" and insert therefore -- $n\geq 2$ --.

Col. 15, line 63, delete "$\underline{n\geq 2}$" and insert therefore -- $n\geq 2$ --.

Col. 17, line 61, delete "$\underline{n\geq 2}$" and insert therefore -- $n\geq 2$ --.

Col. 20, line 20, delete "$\underline{n\geq 2}$" and insert therefore -- $n\geq 2$ --.

IN THE CLAIMS

Claim 30, Col. 25, line 35, after "partial" insert -- image --.

Signed and Sealed this

Twenty-ninth Day of May, 2001

Attest:

NICHOLAS P. GODICI

Attesting Officer

Acting Director of the United States Patent and Trademark Office